US008510448B2

(12) United States Patent
Richardson et al.

(10) Patent No.: US 8,510,448 B2
(45) Date of Patent: *Aug. 13, 2013

(54) SERVICE PROVIDER REGISTRATION BY A CONTENT BROKER

(75) Inventors: David R. Richardson, Seattle, WA (US); Bradley E. Marshall, Bainbridge Island, WA (US); Swaminathan Sivasubramanian, Seattle, WA (US); Tal Saraf, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,971

(22) Filed: Sep. 13, 2012

(65) Prior Publication Data

US 2013/0007284 A1    Jan. 3, 2013

Related U.S. Application Data

(63) Continuation of application No. 13/299,229, filed on Nov. 17, 2011, now Pat. No. 8,301,778, which is a continuation of application No. 12/272,641, filed on Nov. 17, 2008, now Pat. No. 8,065,417.

(51) Int. Cl.
*G06F 15/173* (2006.01)

(52) U.S. Cl.
USPC .......................................................... 709/226

(58) Field of Classification Search
USPC .......................................................... 709/226
See application file for complete search history.

(56) References Cited

U.S. PATENT DOCUMENTS 5,341,477 A    8/1994  Pitkin et al.
5,611,049 A    3/1997  Pitts
(Continued)

FOREIGN PATENT DOCUMENTS

CN    1422468 A    6/2003
CN    1605182 A    4/2005
(Continued)

OTHER PUBLICATIONS

American Bar Association; Digital Signature Guidelines Tutorial [online]; Feb. 10, 2002 [retrived on Mar. 3, 2010]; American Bar Association Section of Science and Technology Information Security Committee; Retrieved from the internet: <URL: http://web.archive.org/web/20020210124615/www.abanet.org/scitech/ec/isc/dsg-tutorial. html; pp. 1-8.

(Continued)

*Primary Examiner* — Imad Hussain
(74) *Attorney, Agent, or Firm* — Knobbe, Martens, Olson & Bear LLP

(57) ABSTRACT

A system, method, and computer readable medium for managing registration, by a content broker, of one or more resources with one or more service providers are provided. A content broker obtains registration information for registering the one or more resources with a service provider. The registration information may include a request to publish one or more resources to a service provider, an identification of the one or more resources, service provider selection criteria provided by the content provider or otherwise selected, and the like. The content broker transmits a service provider generation request corresponding to the registration information to the service provider. Then, the content broker manages and processes data pursuant to registration of the one or more resources with the service provider.

29 Claims, 12 Drawing Sheets

(56) References Cited

U.S. PATENT DOCUMENTS

| | | | |
|---|---|---|---|
| 5,774,660 A | 6/1998 | Brendel et al. | |
| 5,892,914 A | 4/1999 | Pitts | |
| 5,933,811 A | 8/1999 | Angles et al. | |
| 5,974,454 A | 10/1999 | Apfel et al. | |
| 6,016,512 A | 1/2000 | Huitema | |
| 6,026,452 A | 2/2000 | Pitts | |
| 6,052,718 A | 4/2000 | Gifford | |
| 6,085,234 A | 7/2000 | Pitts et al. | |
| 6,098,096 A | 8/2000 | Tsirigotis et al. | |
| 6,108,703 A | 8/2000 | Leighton et al. | |
| 6,182,111 B1 | 1/2001 | Inohara et al. | |
| 6,185,598 B1 | 2/2001 | Farber et al. | |
| 6,192,051 B1 | 2/2001 | Lipman et al. | |
| 6,205,475 B1 | 3/2001 | Pitts | |
| 6,223,288 B1 | 4/2001 | Byrne | |
| 6,275,496 B1 | 8/2001 | Burns et al. | |
| 6,286,043 B1 | 9/2001 | Cuomo et al. | |
| 6,286,084 B1 | 9/2001 | Wexler et al. | |
| 6,304,913 B1 | 10/2001 | Rune | |
| 6,351,743 B1 | 2/2002 | DeArdo et al. | |
| 6,351,775 B1 | 2/2002 | Yu | |
| 6,363,411 B1 | 3/2002 | Dugan et al. | |
| 6,366,952 B2 | 4/2002 | Pitts | |
| 6,374,290 B1 | 4/2002 | Scharber et al. | |
| 6,411,967 B1 | 6/2002 | Van Renesse | |
| 6,415,280 B1 | 7/2002 | Farber et al. | |
| 6,430,607 B1 | 8/2002 | Kavner | |
| 6,438,592 B1 | 8/2002 | Killian | |
| 6,457,047 B1 | 9/2002 | Chandra et al. | |
| 6,484,143 B1 | 11/2002 | Swildens et al. | |
| 6,505,241 B2 | 1/2003 | Pitts | |
| 6,529,953 B1 | 3/2003 | Van Renesse | |
| 6,553,413 B1 | 4/2003 | Leighton et al. | |
| 6,560,610 B1 | 5/2003 | Eatherton et al. | |
| 6,611,873 B1 | 8/2003 | Kanehara | |
| 6,654,807 B2 | 11/2003 | Farber et al. | |
| 6,658,462 B1 | 12/2003 | Dutta | |
| 6,678,791 B1 | 1/2004 | Jacobs et al. | |
| 6,694,358 B1 | 2/2004 | Swildens et al. | |
| 6,697,805 B1 | 2/2004 | Choquier et al. | |
| 6,724,770 B1 | 4/2004 | Van Renesse | |
| 6,732,237 B1 | 5/2004 | Jacobs et al. | |
| 6,754,699 B2 | 6/2004 | Swildens et al. | |
| 6,754,706 B1 | 6/2004 | Swildens et al. | |
| 6,769,031 B1 | 7/2004 | Bero | |
| 6,782,398 B1 | 8/2004 | Bahl | |
| 6,785,704 B1 | 8/2004 | McCanne | |
| 6,804,706 B2 | 10/2004 | Pitts | |
| 6,810,291 B2 | 10/2004 | Card et al. | |
| 6,810,411 B1 | 10/2004 | Coughlin et al. | |
| 6,829,654 B1 | 12/2004 | Jungck | |
| 6,874,017 B1 | 3/2005 | Inoue et al. | |
| 6,963,850 B1 | 11/2005 | Bezos et al. | |
| 6,981,017 B1 | 12/2005 | Kasriel et al. | |
| 6,986,018 B2 | 1/2006 | O'Rourke et al. | |
| 6,990,526 B1 | 1/2006 | Zhu | |
| 6,996,616 B1 | 2/2006 | Leighton et al. | |
| 7,003,555 B1 | 2/2006 | Jungck | |
| 7,006,099 B2 | 2/2006 | Gut et al. | |
| 7,007,089 B2 | 2/2006 | Freedman | |
| 7,010,578 B1 | 3/2006 | Lewin et al. | |
| 7,010,598 B2 * | 3/2006 | Sitaraman et al. | 709/224 |
| 7,032,010 B1 | 4/2006 | Swildens et al. | |
| 7,058,706 B1 | 6/2006 | Iyer et al. | |
| 7,058,953 B2 | 6/2006 | Willard et al. | |
| 7,065,587 B2 | 6/2006 | Huitema et al. | |
| 7,072,982 B2 | 7/2006 | Teodosiu et al. | |
| 7,076,633 B2 | 7/2006 | Tormasov et al. | |
| 7,082,476 B1 | 7/2006 | Cohen et al. | |
| 7,086,061 B1 | 8/2006 | Joshi et al. | |
| 7,092,505 B2 | 8/2006 | Allison et al. | |
| 7,092,997 B1 | 8/2006 | Kasriel et al. | |
| 7,099,936 B2 * | 8/2006 | Chase et al. | 709/223 |
| 7,103,645 B2 | 9/2006 | Leighton et al. | |
| 7,117,262 B2 | 10/2006 | Bai et al. | |
| 7,133,905 B2 | 11/2006 | Dilley et al. | |
| 7,139,821 B1 | 11/2006 | Shah et al. | |
| 7,143,169 B1 | 11/2006 | Champagne et al. | |
| 7,146,560 B2 | 12/2006 | Dang et al. | |
| 7,149,809 B2 | 12/2006 | Barde et al. | |
| 7,152,118 B2 | 12/2006 | Anderson, IV et al. | |
| 7,174,382 B2 | 2/2007 | Ramanathan et al. | |
| 7,185,063 B1 | 2/2007 | Kasriel et al. | |
| 7,188,214 B1 | 3/2007 | Kasriel et al. | |
| 7,194,522 B1 | 3/2007 | Swildens et al. | |
| 7,200,667 B2 | 4/2007 | Teodosiu et al. | |
| 7,225,254 B1 | 5/2007 | Swildens et al. | |
| 7,228,350 B2 | 6/2007 | Hong et al. | |
| 7,233,978 B2 | 6/2007 | Overton et al. | |
| 7,240,100 B1 | 7/2007 | Wein et al. | |
| 7,254,636 B1 | 8/2007 | O'Toole, Jr. et al. | |
| 7,260,598 B1 | 8/2007 | Liskov et al. | |
| 7,269,784 B1 | 9/2007 | Kasriel et al. | |
| 7,289,519 B1 | 10/2007 | Liskov | |
| 7,293,093 B2 | 11/2007 | Leighton | |
| 7,310,686 B2 | 12/2007 | Uysal | |
| 7,316,648 B2 | 1/2008 | Kelly et al. | |
| 7,320,131 B1 | 1/2008 | O'Toole, Jr. | |
| 7,321,918 B2 | 1/2008 | Burd et al. | |
| 7,363,291 B1 | 4/2008 | Page | |
| 7,430,610 B2 | 9/2008 | Pace et al. | |
| 7,441,045 B2 | 10/2008 | Skene et al. | |
| 7,461,170 B1 | 12/2008 | Taylor et al. | |
| 7,464,142 B2 | 12/2008 | Flurry et al. | |
| 7,492,720 B2 | 2/2009 | Pruthi et al. | |
| 7,499,998 B2 | 3/2009 | Toebes et al. | |
| 7,502,836 B1 | 3/2009 | Menditto et al. | |
| 7,519,720 B2 | 4/2009 | Fishman et al. | |
| 7,548,947 B2 | 6/2009 | Kasriel et al. | |
| 7,552,235 B2 | 6/2009 | Chase et al. | |
| 7,565,407 B1 | 7/2009 | Hayball | |
| 7,573,916 B1 | 8/2009 | Bechtolsheim et al. | |
| 7,594,189 B1 | 9/2009 | Walker et al. | |
| 7,623,460 B2 | 11/2009 | Miyazaki | |
| 7,624,169 B2 | 11/2009 | Lisiecki et al. | |
| 7,640,296 B2 | 12/2009 | Fuchs et al. | |
| 7,650,376 B1 | 1/2010 | Blumenau | |
| 7,653,700 B1 | 1/2010 | Bahl et al. | |
| 7,653,725 B2 | 1/2010 | Yahiro et al. | |
| 7,657,622 B1 * | 2/2010 | Douglis et al. | 709/224 |
| 7,680,897 B1 | 3/2010 | Carter et al. | |
| 7,702,724 B1 * | 4/2010 | Brydon et al. | 709/203 |
| 7,706,740 B2 | 4/2010 | Collins et al. | |
| 7,707,314 B2 | 4/2010 | McCarthy et al. | |
| 7,716,367 B1 | 5/2010 | Leighton et al. | |
| 7,725,602 B2 | 5/2010 | Liu et al. | |
| 7,739,400 B2 | 6/2010 | Lindbo et al. | |
| 7,747,720 B2 | 6/2010 | Toebes et al. | |
| 7,756,913 B1 * | 7/2010 | Day | 707/821 |
| 7,761,572 B1 | 7/2010 | Auerbach | |
| 7,769,823 B2 | 8/2010 | Jenny et al. | |
| 7,773,596 B1 | 8/2010 | Marques | |
| 7,774,342 B1 | 8/2010 | Virdy | |
| 7,787,380 B1 | 8/2010 | Aggarwal et al. | |
| 7,792,989 B2 | 9/2010 | Toebes et al. | |
| 7,809,597 B2 | 10/2010 | Das et al. | |
| 7,813,308 B2 | 10/2010 | Reddy et al. | |
| 7,818,454 B2 | 10/2010 | Kim et al. | |
| 7,836,177 B2 | 11/2010 | Kasriel et al. | |
| 7,904,875 B2 | 3/2011 | Hegyi | |
| 7,912,921 B2 | 3/2011 | O'Rourke et al. | |
| 7,925,782 B2 | 4/2011 | Sivasubramanian et al. | |
| 7,930,393 B1 | 4/2011 | Baumback et al. | |
| 7,930,427 B2 | 4/2011 | Josefsberg et al. | |
| 7,933,988 B2 | 4/2011 | Nasuto et al. | |
| 7,937,477 B1 | 5/2011 | Day et al. | |
| 7,949,779 B2 | 5/2011 | Farber et al. | |
| 7,962,597 B2 | 6/2011 | Richardson et al. | |
| 7,966,404 B2 | 6/2011 | Hedin et al. | |
| 7,979,509 B1 | 7/2011 | Malmskog et al. | |
| 7,991,910 B2 | 8/2011 | Richardson et al. | |
| 7,996,535 B2 | 8/2011 | Auerbach | |
| 8,000,724 B1 | 8/2011 | Rayburn et al. | |
| 8,028,090 B2 | 9/2011 | Richardson et al. | |

| | | |
|---|---|---|
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,117,306 B1* | 2/2012 | Baumback et al. ............ 709/224 |
| 8,122,098 B1 | 2/2012 | Richardson et al. |
| 8,122,124 B1 | 2/2012 | Baumback et al. |
| 8,135,820 B2 | 3/2012 | Richardson et al. |
| 8,190,682 B2 | 5/2012 | Paterson-Jones et al. |
| 8,301,645 B1 | 10/2012 | Crook |
| 8,321,568 B2 | 11/2012 | Sivasubramanian et al. |
| 8,402,137 B2 | 3/2013 | Sivasubramanian et al. |
| 2001/0000811 A1 | 5/2001 | May et al. |
| 2001/0032133 A1 | 10/2001 | Moran |
| 2001/0034704 A1* | 10/2001 | Farhat et al. .................... 705/39 |
| 2001/0049741 A1 | 12/2001 | Skene et al. |
| 2001/0052016 A1* | 12/2001 | Skene et al. .................. 709/226 |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1* | 5/2002 | Swildens et al. ............. 709/223 |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1* | 6/2002 | Biliris et al. .................. 709/238 |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1* | 7/2002 | Boubez et al. .................... 705/7 |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0116481 A1 | 8/2002 | Lee |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0156911 A1 | 10/2002 | Croman et al. |
| 2002/0161767 A1 | 10/2002 | Shapiro et al. |
| 2002/0163882 A1 | 11/2002 | Bornstein et al. |
| 2002/0188722 A1 | 12/2002 | Banerjee et al. |
| 2002/0198953 A1 | 12/2002 | O'Rourke et al. |
| 2003/0002484 A1 | 1/2003 | Freedman |
| 2003/0009591 A1 | 1/2003 | Hayball et al. |
| 2003/0028642 A1 | 2/2003 | Agarwal et al. |
| 2003/0033283 A1 | 2/2003 | Evans et al. |
| 2003/0037139 A1* | 2/2003 | Shteyn .......................... 709/225 |
| 2003/0065739 A1 | 4/2003 | Shnier |
| 2003/0074401 A1* | 4/2003 | Connell et al. ................ 709/203 |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0101278 A1 | 5/2003 | Garcia-Luna-Aceves et al. |
| 2003/0120741 A1 | 6/2003 | Wu et al. |
| 2003/0133554 A1* | 7/2003 | Nykanen et al. ......... 379/201.01 |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1* | 8/2003 | Chaudhri et al. .................. 705/1 |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1* | 10/2003 | Chase et al. .................. 709/223 |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0236700 A1* | 12/2003 | Arning et al. .................... 705/11 |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064501 A1 | 4/2004 | Jan et al. |
| 2004/0073596 A1 | 4/2004 | Kloninger et al. |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1* | 1/2005 | McCanne ...................... 709/219 |
| 2005/0021706 A1 | 1/2005 | Maggi et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1* | 5/2005 | Balasubramanian et al. .. 705/50 |
| 2005/0108529 A1 | 5/2005 | Juneau |
| 2005/0114296 A1 | 5/2005 | Farber et al. |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1* | 9/2005 | Desai et al. ................. 455/435.2 |
| 2005/0216569 A1 | 9/2005 | Coppola et al. |
| 2005/0216674 A1 | 9/2005 | Robbin et al. |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |

| | | | | | |
|---|---|---|---|---|---|
| 2006/0064476 A1 | 3/2006 | Decasper et al. | 2008/0103805 A1 | 5/2008 | Shear et al. |
| 2006/0064500 A1 | 3/2006 | Roth et al. | 2008/0104268 A1 | 5/2008 | Farber et al. |
| 2006/0074750 A1 | 4/2006 | Clark et al. | 2008/0114829 A1 | 5/2008 | Button et al. |
| 2006/0075084 A1 | 4/2006 | Lyon | 2008/0134043 A1 | 6/2008 | Georgis et al. |
| 2006/0075139 A1 | 4/2006 | Jungck | 2008/0147866 A1 | 6/2008 | Stolorz et al. |
| 2006/0083165 A1* | 4/2006 | McLane et al. ............... 370/229 | 2008/0147873 A1 | 6/2008 | Matsumoto |
| 2006/0112066 A1 | 5/2006 | Hamzy | 2008/0155061 A1 | 6/2008 | Afergan et al. |
| 2006/0112176 A1 | 5/2006 | Liu et al. | 2008/0155614 A1 | 6/2008 | Cooper et al. |
| 2006/0120385 A1 | 6/2006 | Atchison et al. | 2008/0162667 A1 | 7/2008 | Verma et al. |
| 2006/0129665 A1 | 6/2006 | Toebes et al. | 2008/0172488 A1 | 7/2008 | Jawahar et al. |
| 2006/0143293 A1 | 6/2006 | Freedman | 2008/0189437 A1 | 8/2008 | Halley |
| 2006/0155823 A1 | 7/2006 | Tran et al. | 2008/0201332 A1 | 8/2008 | Souders et al. |
| 2006/0161541 A1 | 7/2006 | Cencini | 2008/0215718 A1 | 9/2008 | Stolorz et al. |
| 2006/0168088 A1 | 7/2006 | Leighton et al. | 2008/0215735 A1 | 9/2008 | Farber et al. |
| 2006/0184936 A1 | 8/2006 | Abels et al. | 2008/0215750 A1 | 9/2008 | Farber et al. |
| 2006/0190605 A1* | 8/2006 | Franz et al. .................... 709/226 | 2008/0222281 A1 | 9/2008 | Dilley et al. |
| 2006/0193247 A1 | 8/2006 | Naseh et al. | 2008/0222291 A1 | 9/2008 | Weller et al. |
| 2006/0195866 A1 | 8/2006 | Thukral | 2008/0222295 A1 | 9/2008 | Robinson et al. |
| 2006/0218304 A1 | 9/2006 | Mukherjee et al. | 2008/0228920 A1 | 9/2008 | Souders et al. |
| 2006/0227740 A1 | 10/2006 | McLaughlin et al. | 2008/0235400 A1 | 9/2008 | Slocombe et al. |
| 2006/0230137 A1 | 10/2006 | Gare et al. | 2008/0275772 A1* | 11/2008 | Suryanarayana et al. ...... 705/14 |
| 2006/0233155 A1 | 10/2006 | Srivastava | 2008/0281950 A1 | 11/2008 | Wald et al. |
| 2006/0253546 A1 | 11/2006 | Chang et al. | 2008/0288722 A1 | 11/2008 | Lecoq et al. |
| 2006/0253609 A1 | 11/2006 | Andreev et al. | 2008/0301670 A1 | 12/2008 | Gouge et al. |
| 2006/0259581 A1 | 11/2006 | Piersol | 2008/0319862 A1 | 12/2008 | Golan et al. |
| 2006/0259690 A1 | 11/2006 | Vittal et al. | 2009/0013063 A1 | 1/2009 | Soman |
| 2006/0259984 A1 | 11/2006 | Juneau | 2009/0016236 A1 | 1/2009 | Alcala et al. |
| 2006/0265508 A1 | 11/2006 | Angel et al. | 2009/0029644 A1 | 1/2009 | Sue et al. |
| 2006/0265516 A1 | 11/2006 | Schilling | 2009/0031367 A1 | 1/2009 | Sue |
| 2006/0265720 A1* | 11/2006 | Cai et al. ........................ 719/330 | 2009/0031368 A1 | 1/2009 | Ling |
| 2006/0271641 A1 | 11/2006 | Stavrakos et al. | 2009/0031376 A1* | 1/2009 | Riley et al. .................... 725/105 |
| 2006/0282522 A1 | 12/2006 | Lewin et al. | 2009/0049098 A1 | 2/2009 | Pickelsimer et al. |
| 2007/0005689 A1 | 1/2007 | Leighton et al. | 2009/0070533 A1 | 3/2009 | Elazary et al. |
| 2007/0005892 A1 | 1/2007 | Mullender et al. | 2009/0083228 A1 | 3/2009 | Shatz et al. |
| 2007/0011267 A1 | 1/2007 | Overton et al. | 2009/0086741 A1* | 4/2009 | Zhang et al. ................... 370/401 |
| 2007/0014241 A1 | 1/2007 | Banerjee et al. | 2009/0103707 A1 | 4/2009 | McGary et al. |
| 2007/0021998 A1 | 1/2007 | Laithwaite et al. | 2009/0106381 A1 | 4/2009 | Kasriel et al. |
| 2007/0038994 A1 | 2/2007 | Davis et al. | 2009/0112703 A1 | 4/2009 | Brown |
| 2007/0041393 A1 | 2/2007 | Westhead et al. | 2009/0125934 A1 | 5/2009 | Jones et al. |
| 2007/0043859 A1 | 2/2007 | Ruul | 2009/0132368 A1 | 5/2009 | Cotter et al. |
| 2007/0050522 A1 | 3/2007 | Grove et al. | 2009/0132648 A1 | 5/2009 | Swildens et al. |
| 2007/0055764 A1 | 3/2007 | Dilley et al. | 2009/0144412 A1 | 6/2009 | Ferguson et al. |
| 2007/0076872 A1 | 4/2007 | Juneau | 2009/0150926 A1 | 6/2009 | Schlack |
| 2007/0086429 A1 | 4/2007 | Lawrence et al. | 2009/0157850 A1 | 6/2009 | Gagliardi et al. |
| 2007/0094361 A1 | 4/2007 | Hoynowski et al. | 2009/0158163 A1 | 6/2009 | Stephens et al. |
| 2007/0101377 A1 | 5/2007 | Six et al. | 2009/0164331 A1 | 6/2009 | Bishop et al. |
| 2007/0118667 A1 | 5/2007 | McCarthy et al. | 2009/0177667 A1 | 7/2009 | Ramos et al. |
| 2007/0118668 A1 | 5/2007 | McCarthy et al. | 2009/0182815 A1 | 7/2009 | Czechowski et al. |
| 2007/0134641 A1 | 6/2007 | Lieu | 2009/0182945 A1 | 7/2009 | Aviles et al. |
| 2007/0168517 A1 | 7/2007 | Weller | 2009/0187575 A1 | 7/2009 | DaCosta |
| 2007/0174426 A1* | 7/2007 | Swildens et al. ............... 709/217 | 2009/0204682 A1 | 8/2009 | Jeyaseelan et al. |
| 2007/0174442 A1 | 7/2007 | Sherman et al. | 2009/0210549 A1 | 8/2009 | Hudson et al. |
| 2007/0174490 A1 | 7/2007 | Choi et al. | 2009/0248786 A1* | 10/2009 | Richardson et al. .......... 709/201 |
| 2007/0183342 A1 | 8/2007 | Wong et al. | 2009/0248787 A1* | 10/2009 | Sivasubramanian et al. . 709/201 |
| 2007/0198982 A1 | 8/2007 | Bolan et al. | 2009/0248852 A1 | 10/2009 | Fuhrmann et al. |
| 2007/0208737 A1 | 9/2007 | Li et al. | 2009/0248858 A1* | 10/2009 | Sivasubramanian et al. . 709/224 |
| 2007/0219795 A1 | 9/2007 | Park et al. | 2009/0248893 A1* | 10/2009 | Richardson et al. .......... 709/239 |
| 2007/0220010 A1 | 9/2007 | Ertugrul | 2009/0259971 A1 | 10/2009 | Rankine et al. |
| 2007/0244964 A1 | 10/2007 | Challenger et al. | 2009/0271577 A1 | 10/2009 | Campana et al. |
| 2007/0250467 A1 | 10/2007 | Mesnik et al. | 2009/0271730 A1 | 10/2009 | Rose et al. |
| 2007/0250560 A1 | 10/2007 | Wein et al. | 2009/0279444 A1* | 11/2009 | Ravindran et al. ............. 370/252 |
| 2007/0253377 A1 | 11/2007 | Janneteau et al. | 2009/0287750 A1 | 11/2009 | Banavar et al. |
| 2007/0266113 A1 | 11/2007 | Koopmans et al. | 2009/0307307 A1 | 12/2009 | Igarashi |
| 2007/0266311 A1 | 11/2007 | Westphal | 2009/0327489 A1 | 12/2009 | Swildens et al. |
| 2007/0266333 A1 | 11/2007 | Cossey et al. | 2009/0327517 A1* | 12/2009 | Sivasubramanian et al. . 709/238 |
| 2007/0271385 A1 | 11/2007 | Davis et al. | 2009/0327914 A1 | 12/2009 | Adar et al. |
| 2007/0280229 A1 | 12/2007 | Kenney | 2010/0005175 A1 | 1/2010 | Swildens et al. |
| 2007/0288588 A1 | 12/2007 | Wein et al. | 2010/0011061 A1 | 1/2010 | Hudson et al. |
| 2008/0005057 A1 | 1/2008 | Ozzie et al. | 2010/0023601 A1* | 1/2010 | Lewin et al. ................... 709/218 |
| 2008/0008089 A1* | 1/2008 | Bornstein et al. .............. 370/227 | 2010/0030662 A1 | 2/2010 | Klein |
| 2008/0025304 A1 | 1/2008 | Venkataswami et al. | 2010/0036944 A1* | 2/2010 | Douglis et al. ................. 709/224 |
| 2008/0046596 A1 | 2/2008 | Afergan et al. | 2010/0070603 A1 | 3/2010 | Moss et al. |
| 2008/0065724 A1 | 3/2008 | Seed et al. | 2010/0088367 A1 | 4/2010 | Brown et al. |
| 2008/0065745 A1 | 3/2008 | Leighton et al. | 2010/0088405 A1 | 4/2010 | Huang et al. |
| 2008/0071859 A1 | 3/2008 | Seed et al. | 2010/0100629 A1 | 4/2010 | Raciborski et al. |
| 2008/0071987 A1 | 3/2008 | Karn et al. | 2010/0111059 A1 | 5/2010 | Bappu et al. |
| 2008/0072264 A1 | 3/2008 | Crayford | 2010/0121953 A1 | 5/2010 | Friedman et al. |
| 2008/0082551 A1 | 4/2008 | Farber et al. | 2010/0122069 A1 | 5/2010 | Gonion |
| 2008/0086574 A1 | 4/2008 | Raciborski et al. | 2010/0125673 A1* | 5/2010 | Richardson et al. .......... 709/239 |

| | | | |
|---|---|---|---|
| 2010/0125675 A1* | 5/2010 | Richardson et al. | 709/242 |
| 2010/0131646 A1 | 5/2010 | Drako | |
| 2010/0150155 A1 | 6/2010 | Napierala | |
| 2010/0192225 A1 | 7/2010 | Ma et al. | |
| 2010/0217801 A1 | 8/2010 | Leighton et al. | |
| 2010/0226372 A1 | 9/2010 | Watanabe | |
| 2010/0257566 A1 | 10/2010 | Matila | |
| 2010/0293479 A1 | 11/2010 | Rousso et al. | |
| 2010/0299439 A1 | 11/2010 | McCarthy et al. | |
| 2010/0318508 A1 | 12/2010 | Brawer et al. | |
| 2010/0332595 A1 | 12/2010 | Fullagar et al. | |
| 2011/0040893 A1 | 2/2011 | Karaoguz et al. | |
| 2011/0078000 A1 | 3/2011 | Ma et al. | |
| 2011/0078230 A1 | 3/2011 | Sepulveda | |
| 2011/0096987 A1 | 4/2011 | Morales et al. | |
| 2011/0153941 A1 | 6/2011 | Spatscheck et al. | |
| 2011/0238501 A1 | 9/2011 | Almeida | |
| 2011/0238793 A1 | 9/2011 | Bedare et al. | |
| 2011/0252142 A1 | 10/2011 | Richardson et al. | |
| 2011/0252143 A1 | 10/2011 | Baumback et al. | |
| 2011/0258049 A1 | 10/2011 | Ramer et al. | |
| 2011/0276623 A1 | 11/2011 | Girbal | |
| 2012/0066360 A1 | 3/2012 | Ghosh | |
| 2012/0179839 A1 | 7/2012 | Raciborski et al. | |

FOREIGN PATENT DOCUMENTS

| | | | |
|---|---|---|---|
| CN | 101189598 A | 5/2008 | |
| CN | 101460907 A | 6/2009 | |
| EP | 2008167 | 12/2008 | |
| JP | 2003-167810 A | 6/2003 | |
| JP | 2003522358 A | 7/2003 | |
| JP | 2007-133896 A | 5/2007 | |
| WO | WO 2007/007960 A1 | 1/2007 | |
| WO | WO 2007/126837 A3 | 11/2007 | |
| WO | WO 2012/044587 A1 | 4/2012 | |

OTHER PUBLICATIONS

Baglioni et al., "Preprocessing and Mining Web Log Data for Web Personalization", LNAI 2829, 2003, pp. 237-249.

First Office Action in Chinese Application No. 200980119993.1 dated Jul. 4, 2012.

First Office Action in Chinese Application No. 200980119995.0 dated Jul. 6, 2012.

International Search Report and Written Opinion in PCT/US2011/053302 mailed Nov. 28, 2011 in 11 pages.

International Search Report and Written Opinion in PCT/US2011/061486 mailed Mar. 30, 2012 in 11 pages.

Liu et al., "Combined mining of Web server logs and web contents for classifying user navigation patterns and predicting users' future requests," Data & Knowledge Engineering 61 (2007) pp. 304-330.

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

Supplementary European Search Report in Application No. 09727694.3 mailed Jan. 30, 2012 in 6 pages.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

Singapore Written Opinion in Application No. 201006836-9, mailed Apr. 30, 2012 in 10 pages.

Deleuze, C., et al., A DNS Based Mapping Peering System for Peering CDNs, draft-deleuze-cdnp-dnsmap-peer-00.txt, Nov. 20, 2000, 20 pages.

First Office Action in Chinese Application No. 200980111426.1 mailed Feb. 16, 2013.

International Search Report and Written Opinion in PCT/US2010/060567 mailed on Mar. 28, 2012.

Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.

Office Action in Candian Application No. 2741895 dated Feb. 25, 2013.

Office Action in Japanese Application No. 2011-502138 mailed Feb. 1, 2013.

Singapore Examination Report in Application No. 201006837-7 mailed May 16, 2012.

Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.

Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.

Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.

First Office Action in Chinese Application No. 200980145872.4 dated Nov. 29, 2012.

Search Report and Written Opinion in Singapore Application No. 201103333-9 mailed Nov. 19, 2012.

"Global Server Load Balancing with ServerIron," Foundry Networks, retrieved Aug. 30, 2007, from http://www.foundrynet.com/pdf/an-global-server-load-bal.pdf, 7 pages.

"Grid Computing Solutions," Sun Microsystems, Inc., retrieved May 3, 2006, from http://www.sun.com/software/grid, 3 pages.

"Grid Offerings," Java.net, retrieved May 3, 2006, from http://wiki.java.net/bin/view/Sungrid/OtherGridOfferings, 8 pages.

"Recent Advances Boost System Virtualization," eWeek.com, retrieved from May 3, 2006, http://www.eWeek.com/article2/0,1895,1772626,00.asp, 5 pages.

"Scaleable Trust of Next Generation Management (STRONG-MAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.

"Xen—The Xen virtual Machine Monitor," University of Cambridge Computer Laboratory, retrieved Nov. 8, 2005, from http://www.cl.cam.ac.uk/Research/SRG/netos/xen/, 2 pages.

"XenFaq," retrieved Nov. 8, 2005, from http://wiki.xensource.com/xenwiki/XenFaq?action=print, 9 pages.

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

Bellovin, S., "Distributed Firewalls," ;login:;37-39, Nov. 1999, http://www.cs.columbia.edu/-smb/papers/distfw. html, 10 pages, retrieved Nov. 11, 2005.

Blaze, M., "Using the KeyNote Trust Management System," Mar. 1, 2001, from http://www.crypto.com/trustmgt/kn.html, 4 pages, retrieved May 17, 2006.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Byun et al., "A Dynamic Grid Services Deployment Mechanism for On-Demand Resource Provisioning", IEEE International Symposium on Cluster Computing and the Grid:863-870, 2005.

Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.

Coulson, D., "Network Security Iptables," Apr. 2003, Linuxpro, Part 2, retrieved from http://davidcoulson.net/writing/lxf/38/iptables.pdf, 4 pages.

Coulson, D., "Network Security Iptables," Mar. 2003, Linuxpro, Part 1, retrieved from http://davidcoulson.net/writing/lxf/39/iptables.pdf, 4 pages.

Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.

Gruener, J., "A Vision of Togetherness," May 24, 2004, NetworkWorld, retrieved May 3, 2006, from, http://www.networkworld.com/supp/2004/ndc3/0524virt.html, 9 pages.

International Preliminary Report on Patentability in PCT/US2007/007601 mailed Sep. 30, 2008 in 8 pages.

International Search Report and Written Opinion in PCT/US07/07601 mailed Jul. 18, 2008 in 11 pages.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/pdf, 10 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Kenshi, P., "Help File Library: Iptables Basics," Justlinux, retrieved Dec. 1, 2005, from http://www.justlinux.com/nhf/Security/Iptables_Basics.html, 4 pages.

Office Action in Japanese Application No. 2011-502140 mailed Dec. 7, 2012.

Office Action in Japanese Application No. 2012-052264 mailed Dec. 11, 2012 in 26 pages.

Shankland, S., "Sun to buy start-up to bolster N1 ," Jul. 30, 2003, CNet News.com, retrieved May 3, 2006, http://news.zdnet.com/2100-3513_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Supplementary European Search Report in Application No. 07754164.7 mailed Dec. 20, 2010 in 7 pages.

Supplementary European Search Report in Application No. 09728756.9 mailed Jan. 8, 2013.

Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.

Virtual Iron Software Home, Virtual Iron, retrieved May 3, 2006, from http://www.virtualiron.com/, 1 page.

Waldspurger, CA., "Spawn: A Distributed Computational Economy," Feb. 1992, IEEE Transactions on Software Engineering, 18(2): 103-117, 15 pages.

Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.

Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).

International Preliminary Report on Patentability and Written Opinion in PCT/US2010/060567 mailed on Jun. 19, 2012.

International Preliminary Report on Patentability and Written Opinion in PCT/US2010/060569 mailed Jun. 19, 2012.

International Preliminary Report on Patentability and Written Opinion in PCT/US2010/060573 mailed Jun. 19, 2012.

International Preliminary Report on Patentability in PCT/US2011/053302 mailed Apr. 2, 2013.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.

Kounev, S., et al., Autonomic QoS-Aware Resource Management in Grid Computing Using Online Performance Models, 2007, ICST, Valuetools, 2007, 10 pages.

Office Action in Chinese Application No. 200780020255.2 dated Mar. 4, 2013.

Office Action in Japanese Application No. 2011-516466 mailed Mar. 6, 2013.

Second Office Action in Chinese Application No. 200980119993.1 dated Mar. 12, 2013.

Waldspurger, CA., "Spawn: A Distributed Computational Economy," Feb. 1992, IEEE Transactions on Software Engineering, 18(2): 103-117,15 pages.

* cited by examiner

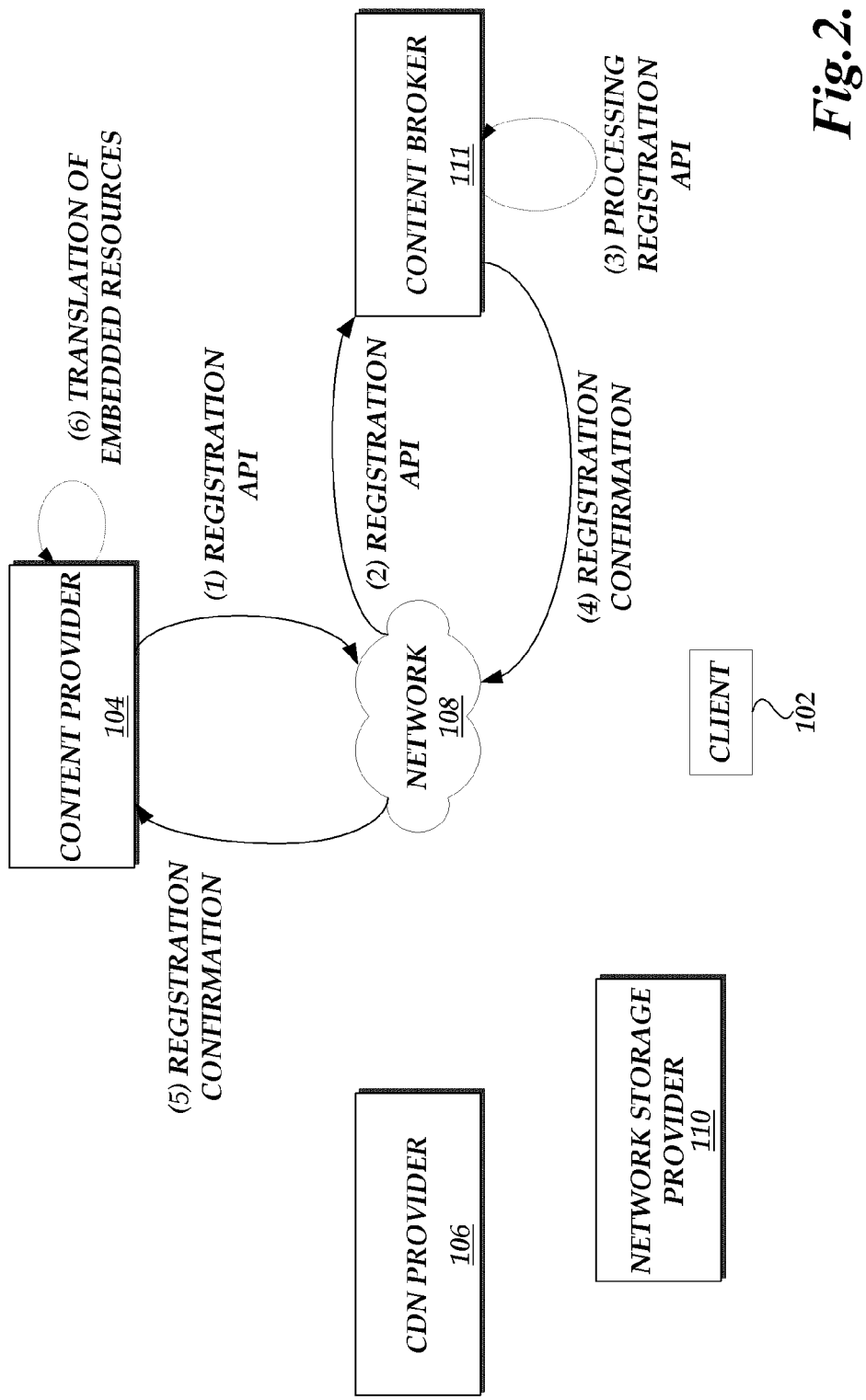

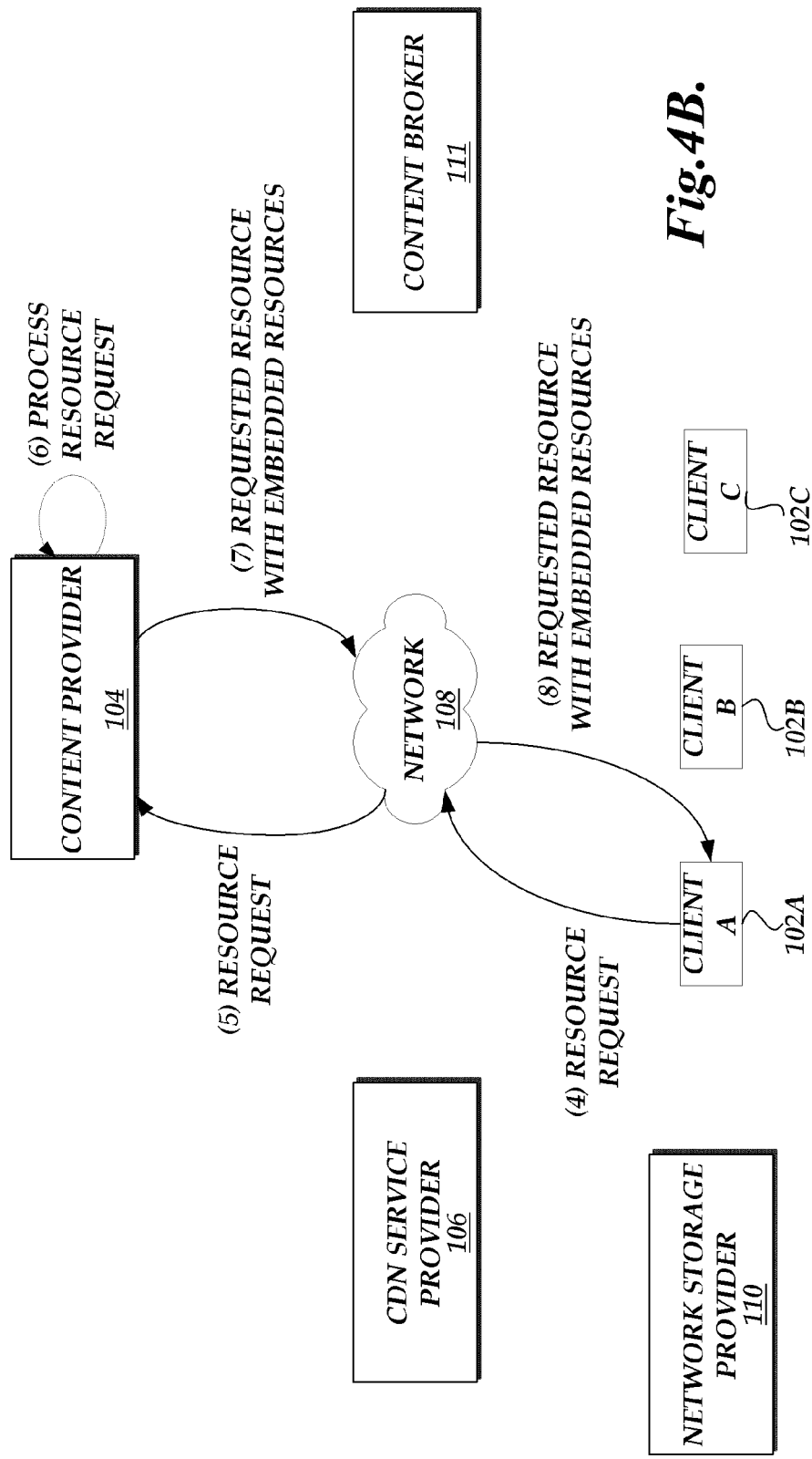

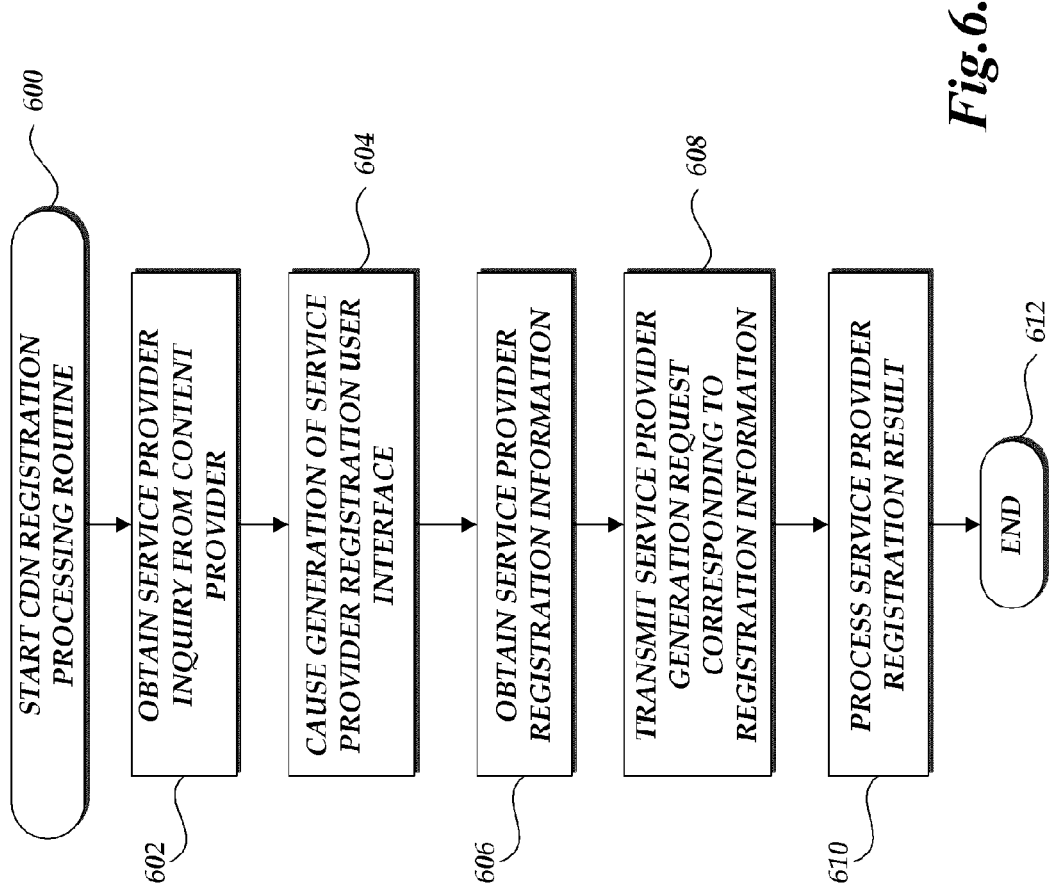

SERVICE PROVIDER REGISTRATION BY A CONTENT BROKER

CROSS REFERENCE TO RELATED APPLICATIONS

This application is a continuation of U.S. patent application Ser. No. 13/299,229, entitled "SERVICE PROVIDER REGISTRATION BY A CONTENT BROKER" and filed on Nov. 17, 2011, which is in turn a continuation of U.S. patent application Ser. No. 12/272,641, which is now U.S. Pat. No. 8,065,417, entitled "SERVICE PROVIDER REGISTRATION BY A CONTENT BROKER" and filed on Nov. 17, 2008, the disclosures of which are incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page and/or the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN server provider each typically maintain a number of computing devices in a communication network that can maintain content from various content providers. In turn, content providers can instruct, or otherwise suggest to, client computing devices to request some, or all, of the content provider's content from the network storage provider's or CDN service provider's computing devices.

As with content providers, network storage providers and CDN service providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is a block diagram of the content delivery environment of FIG. 1 illustrating the registration of a content provider with a content broker;

FIG. 4B is a block diagram of the content delivery environment of FIG. 1 illustrating the generation and processing of a resource request by a client computing device to a content provider;

FIG. 6 is a flow diagram illustrative of a CDN registration processing routine implemented by a network storage provider.

DETAILED DESCRIPTION

Generally described, the present disclosure is directed to managing registration of a content provider, or one or more resources associated with a content provider, with one or more service providers. Specifically, aspects of the disclosure will be described with regard to the management and processing of service provider registration requests made to a content broker by a content provider. Although various aspects of the disclosure will be described with regard to illustrative examples and embodiments, one skilled in the art will appreciate that the disclosed embodiments and examples should not be construed as limiting.

Figure 1:
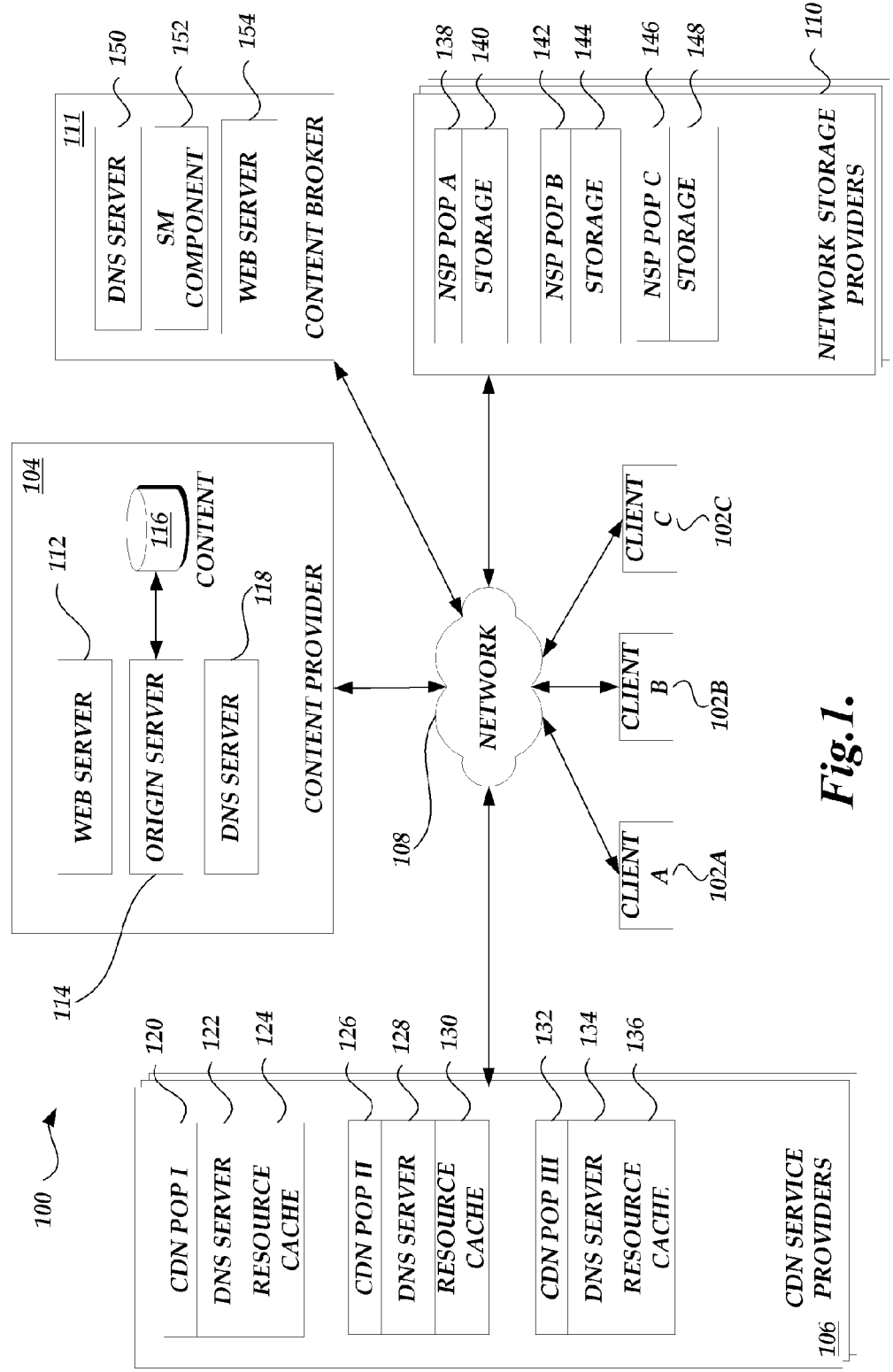
FIG. 1 is a block diagram illustrative of content delivery environment including a number of client computing devices, a content provider, a network storage provider, a content delivery network service provider, and a content broker.

FIG. 1 is a block diagram illustrative of content delivery environment 100 for the managing registration of content with one or more service providers and subsequent processing of content requests. As illustrated in FIG. 1, the content delivery environment 100 includes a number of client computing devices 102 (generally referred to as clients) for requesting content from a content provider, a content broker 111, one or more network storage providers 110, and/or one or more CDN service providers 106. In an illustrative embodiment, the client computing devices 102 can correspond to a wide variety of computing devices including personal computing devices, laptop computing devices, handheld computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources, DNS name servers, and the like. For example, as further illustrated in FIG. 1, the content provider 104 can be associated with one or more DNS name server components 118 that are operative to receive DNS queries related to registered domain names associated with the content provider. The one or more DNS name servers can be authoritative to resolve client computing device DNS queries corresponding to the registered domain names of the content provider 104. A DNS name server component is considered to be authoritative to a DNS query if the DNS name server can resolve the query by providing a responsive IP address.

With continued reference to FIG. 1, the content delivery environment 100 can further include one or more CDN service providers 106 in communication with the one or more client computing devices 102, the content provider 104, the content broker 111, and the one or more network storage providers 110 via the communication network 108. Each CDN service provider 106 illustrated in FIG. 1 corresponds to a logical association of one or more computing devices associated with a CDN service provider. Specifically, the CDN service provider 106 can include a number of Point of Presence ("POP") locations 120, 126, 132 that correspond to nodes on the communication network 108. Each POP 120, 126, 132 includes a DNS component 122, 128, 134 made up of a number of DNS server computing devices for resolving DNS queries from the client computers 102. Each POP 120, 126, 132 also includes a resource cache component 124, 130, 136 made up of a number of cache server computing devices for storing resources from content providers, content brokers, or network storage providers and transmitting various requested resources to various client computers. The DNS components 122, 128, 134 and the resource cache components 124, 130, 136 may further include additional software and/or hardware components that facilitate communications including, but not limited, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include one or more network storage providers 110 in communication with the one or more client computing devices 102, the one or more CDN service providers 106, the content broker 111, and the content provider 104 via the communication network 108. Each network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 142, 146 that correspond to nodes on the communication network 108. Each NSP POP 138, 142, 146 includes a storage component 140, 144, 148 made up of a number of storage devices for storing resources from content providers or content brokers which will be processed by the network storage provider 110 and transmitted to various client computers. The storage components 140, 144, 148 may further include additional software and/or hardware components that facilitate communications including, but not limited to, load balancing or load sharing software/hardware components.

In an illustrative embodiment, the storage components 140, 144, 148 are considered to be logically grouped, regardless of whether the components, or portions of the components, are physically separate. Additionally, although the NSP POPs 138, 142, 146 are illustrated in FIG. 1 as logically associated with the network storage provider 110, the NSP POPs will be geographically distributed throughout the communication network 108 in a manner to best serve various demographics of client computing devices 102. Additionally, one skilled in the relevant art will appreciate that the network storage provider 110 can be associated with various additional computing resources, such as additional computing devices for administration of content and resources, DNS name servers, and the like. For example, the network storage provider 110 can be associated with one or more DNS name server components that are operative to receive DNS queries related to registered domain names associated with the network storage provider 110. The one or more DNS name servers can be authoritative to resolve client computing device DNS queries corresponding to the registered domain names of the network storage provider 110. As similarly set forth above, a DNS name server component is considered to be authoritative to a DNS query if the DNS name server can resolve the query by providing a responsive IP address.

With further continued reference to FIG. 1, the content delivery environment 100 can also include a content broker 111 in communication with the one or more client computing devices 102, the one or more CDN service providers 106, the one or more network storage providers 110, and the content provider 104 via the communication network 108. The content broker 111 illustrated in FIG. 1 also corresponds to a logical association of one or more computing devices associated with a content broker. Specifically, the content broker 111 can include a web server component 154 corresponding to one or more server computing devices for obtaining and processing requests for content (such as Web pages) from the client computing devices 102 in embodiments in which the content broker provides original responsive content (e.g., Web pages) on behalf of the content provider, such as in the form of original hypertext markup language ("HTML") files. The content broker 111 can further include a storage management ("SM") component 152 for monitoring requests for resources and making recommendations to the content provider(s) 104 regarding the utilization of one or more service providers, such as one or more CDN service providers 106 and/or one or more network storage providers 110. The content broker 111 can also utilize the SM component 152 to provide service provider recommendations to the content provider(s) 104, such as via a Web service.

One skilled in the relevant art will appreciate that the content broker 111 can be associated with various additional computing resources, such additional computing devices for administration of content and resources, DNS name servers, and the like. For example, as further illustrated in FIG. 1, the content broker 111 can be associated with one or more DNS name server components 150 that are operative to receive DNS queries related to registered domain names associated with the content broker 111. As will be further described below, the one or more DNS name server components 150 can be authoritative to resolve client computing device DNS queries corresponding to the registered domain names of the content broker 111. As similarly set forth above, a DNS name server component is considered to be authoritative to a DNS query if the DNS name server can resolve the query by providing a responsive IP address.

Even further, one skilled in the relevant art will appreciate that the components of the network storage provider 110, the CDN service provider 106, and the content broker 111 can be managed by the same or different entities. One skilled in the relevant art will also appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-5B, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, an illustrative interaction for registration of a content provider 104 with the content broker 111 will be described. As illustrated in FIG. 2, the content broker content registration process begins with registration of the content provider 104 with the content broker 111. In an illustrative embodiment, the content provider 104 utilizes a registration application program interface ("API") to register with the content broker 111 such that the content broker 111 can facilitate use of one or more service providers, such as CDN service provider 106 or network storage provider 110, to provide content on behalf of the content provider 104. In one embodiment, the content provider 104 may also request that the content broker 111 provide content on its behalf, especially when the content provider 104 does not have its own DNS component. In this embodiment, the content provider 104 may request the content broker 111 to provide original responsive content on behalf of the content provider, such as Web pages in the form of HTML files. The registration API can include the identification of the origin server 114 of the content provider 104 that may provide requested resources to the service providers 106 and 110. In addition or alternatively, the registration API can include the content to be stored and/or provided by the service providers 106 and/or 110 on behalf of the content provider 104. In one embodiment, the content broker 111 may facilitate using the network storage provider 110 as an origin server for the content provider 104.

One skilled in the relevant art will appreciate that upon registration of the content with the content broker 111, the content provider 104 can begin to direct requests for content from client computing devices 102 to the content broker 111. Specifically, in accordance with DNS routing principles, and as will be described in further detail below, a client computing device request corresponding to a resource identifier would eventually be directed toward a service provider, such as CDN service provider 106 or network storage provider 110.

With continued reference to FIG. 2, upon receiving the registration API, the content broker 111 obtains and processes the content provider registration information. In an illustrative embodiment, the content broker 111 can then generate additional information that will be used by the client computing devices 102 as part of the content requests. The additional information can include, without limitation, content provider identifiers, such as content provider identification codes, service provider identifiers, such as service provider identification codes, executable code for processing resource identifiers, such as script-based instructions, and the like. One skilled in the relevant art will appreciate that various types of additional information may be generated by the content broker 111 and that the additional information may be embodied in any one of a variety of formats.

In one embodiment, the content broker 111 returns an identification of applicable domains for the content broker (unless it has been previously provided) and any additional information to the content provider 104. In turn, the content provider 104 can then process the stored content with content broker specific information. In one example, as illustrated in FIG. 2, the content provider 104 translates resource identifiers originally directed toward a domain of the origin server 114 to a domain corresponding to the content broker 111. The translated URLs are embedded into requested content in a manner such that DNS queries for the translated URLs will be processed by a DNS server corresponding to the content broker 111 and not a DNS server corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to the content broker 111. In one embodiment, the modified URL identifies the domain of the content broker 111 (e.g., "contentbroker.com"), the same name of the resource to be requested (e.g., "resource.xxx") and the same path where the resource will be found (e.g., "path"). Additionally, the modified URL can include additional processing information (e.g., "additional information"). The modified URL would have the form of:

http://additional information.contentbroker.com/path/resource.xxx

Figure 3A:
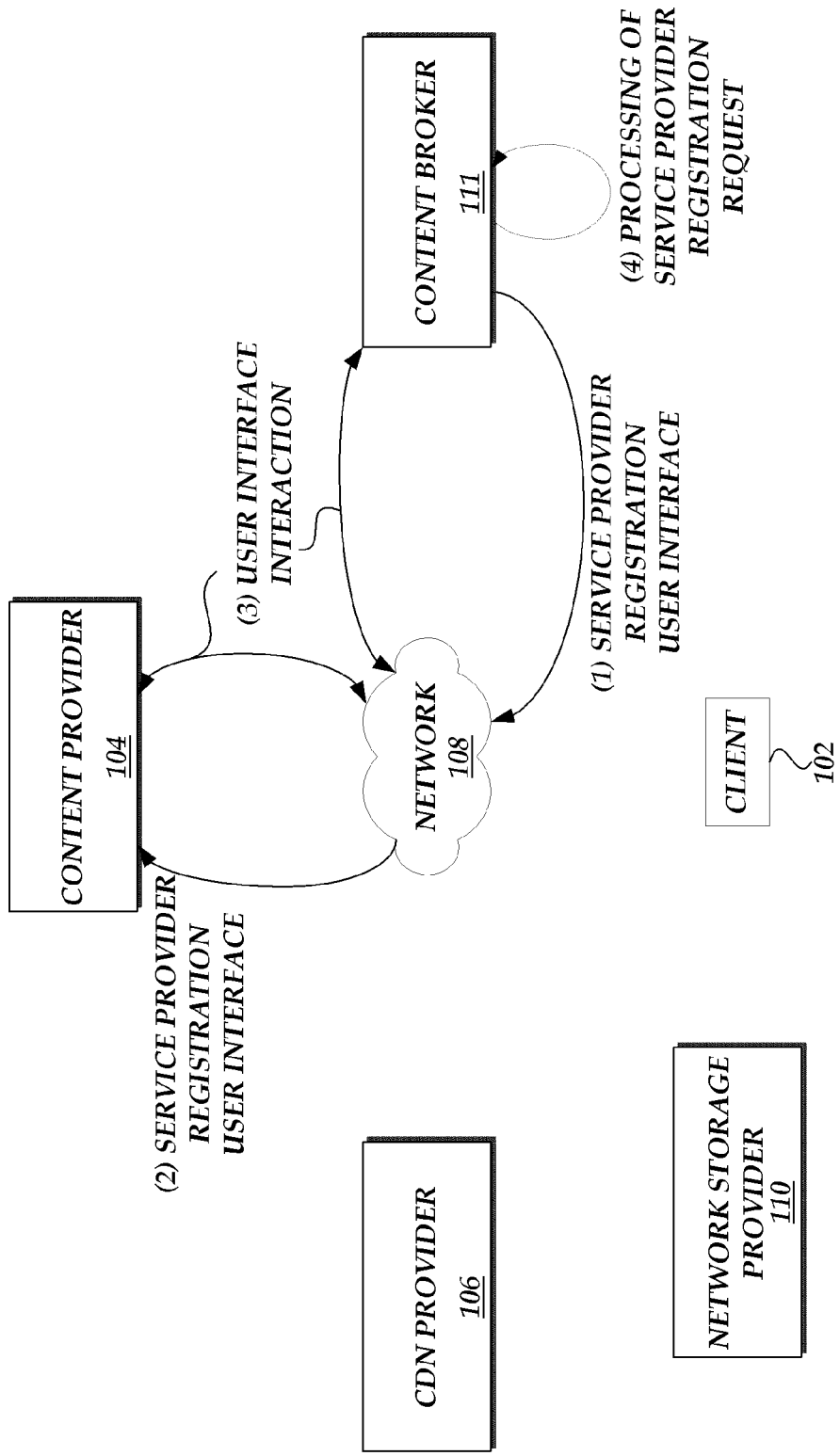
FIG. 3A is a block diagram of the content delivery environment of FIG. 1 illustrating the generation and processing of a service provider registration request from a content provider to a content broker.

In another embodiment, the information associated with the content broker 111 is included in the modified URL, such as through prepending or other techniques, such that the translated URL can maintain all of the information associated with the original URL. In this embodiment, the translated URL would have the form of:

http://additional information.contentbroker.com/www.contentprovider.com/path/resource.xxx With reference now to FIG. 3A, after completion of the registration and translation processes illustrated in FIG. 2, the content broker 111 subsequently causes the generation of a user interface or an API call to the content provider 104 for use in determining whether the content provider 104 desires to register one or more resources with a service provider, such as CDN service provider 106 or network storage provider 110. The content provider 104 receives the service provider registration user interface, such as the user interface that will be described in further detail below in reference to FIG. 7, or the API call from the content broker 111 via network 108. In an illustrative embodiment, the service provider registration user interface can correspond to a Web page that is displayed on a computing device associated with the content provider 104, via the processing of information, such as HTML, extensible markup language ("XML"), and the like. As will be described further below in reference to FIGS. 6 and 7, the service provider registration user interface provides the content provider 104 one or more options regarding whether to have one or more resources associated with the content provider 104 hosted and/or provided by one or more CDN service providers 106, one or more network storage providers 110, or any combination of service providers. In the alternative, an API call would similarly provide the content provider 104 with one or more options to have one or more resources hosted by any number or type of service providers.

In one embodiment, upon receipt of the service provider registration user interface, the content provider 104, such as through a browser software application, processes any of the markup code included in the service provider registration user interface. The service provider registration user interface provides one or more service provider selection components that the content provider 104 can select to send a request to the content broker 111 via network 108 to publish one or more resources to a CDN service provider 106, a network storage provider 110, or any combination of service providers. Upon selection of the one or more service provider selection components, the content provider 104 sends a corresponding service provider registration request to the content broker 111 via network 108. As will also be further described below, other user interface interaction information may also be provided to the content broker 111. For example, the content provider 104 may identify various service provider selection criteria, such as a regional service plan or a service level plan associated with a service provider, via the service provider registration user interface. The content broker 111 receives and processes the service provider registration request together with any additional information provided by the content provider 104.

Figure 3B:
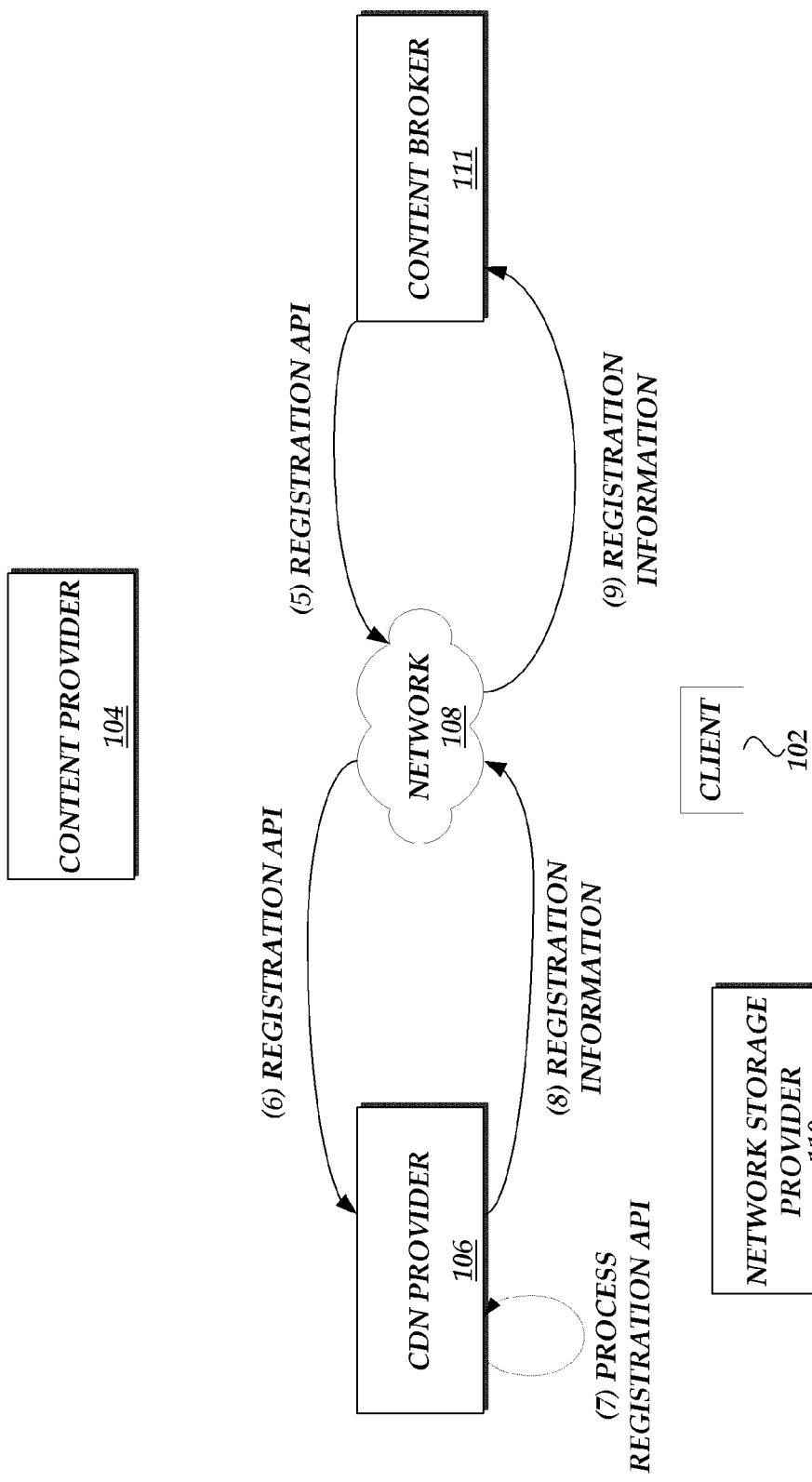
FIG. 3B is a block diagram of the content delivery environment of FIG. 1 illustrating the registration, by a content broker, of one or more resources with a content delivery network service provider.

With reference now to FIG. 3B, an illustrative interaction for registration, by the content broker 111, of the one or more resources associated with a content provider 104 with the CDN service provider 106 will be described. As illustrated in FIG. 3B, the CDN content registration process begins with registration by the content broker 111 of the one or more resources associated with the content provider 104 with the CDN service provider 106. In an illustrative embodiment, the content broker 111 utilizes a registration application program interface ("API") to register with the CDN service provider 106 such that the CDN service provider 106 can provide the one or more resources on behalf of the content provider 104. The registration API includes the identification of the current storage location, such as the content provider origin server 114, a storage component 140, 144, 148 of the network storage provider 110, or the SM component of the content broker 111, which will provide requested resources to the CDN service provider 106.

One skilled in the relevant art will appreciate that upon identification of appropriate storage location of the one or more resources, the content provider 104 or the content broker 111 can, as will be further described below in reference to FIGS. 4 and 5, begin to direct requests for content from client computing devices 102 to the CDN service provider 106. Specifically, in accordance with DNS routing principles, a client computing device request corresponding to a resource identifier would eventually be directed toward a POP 120, 126, 132 associated with the CDN service provider 106. In the event that the resource cache component 124, 130, 136 of a selected POP does not have a copy of a resource requested by a client computing device 102, the resource cache component will request the resource from the storage location previously registered by the content broker 111 on behalf of the content provider 104. In an alternative embodiment, the POP 120, 126, 132 of the CDN service provider 106 which receives the client computing device request may perform further request routing before resolving the request.

With continued reference to FIG. 3B, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, content provider identifiers, such as content provider identification codes, CDN identifiers, such as CDN identification codes, executable code for processing resource identifiers, such as script-based instructions, and the like. One skilled in the relevant art will appreciate that various types of additional information may be generated by the CDN service provider 106 and that the additional information may be embodied in any one of a variety of formats. The CDN service provider 106 then returns an identification of applicable domains for the CDN service provider (unless it has been previously provided) and any additional information to the content broker 111.

Figure 3C:
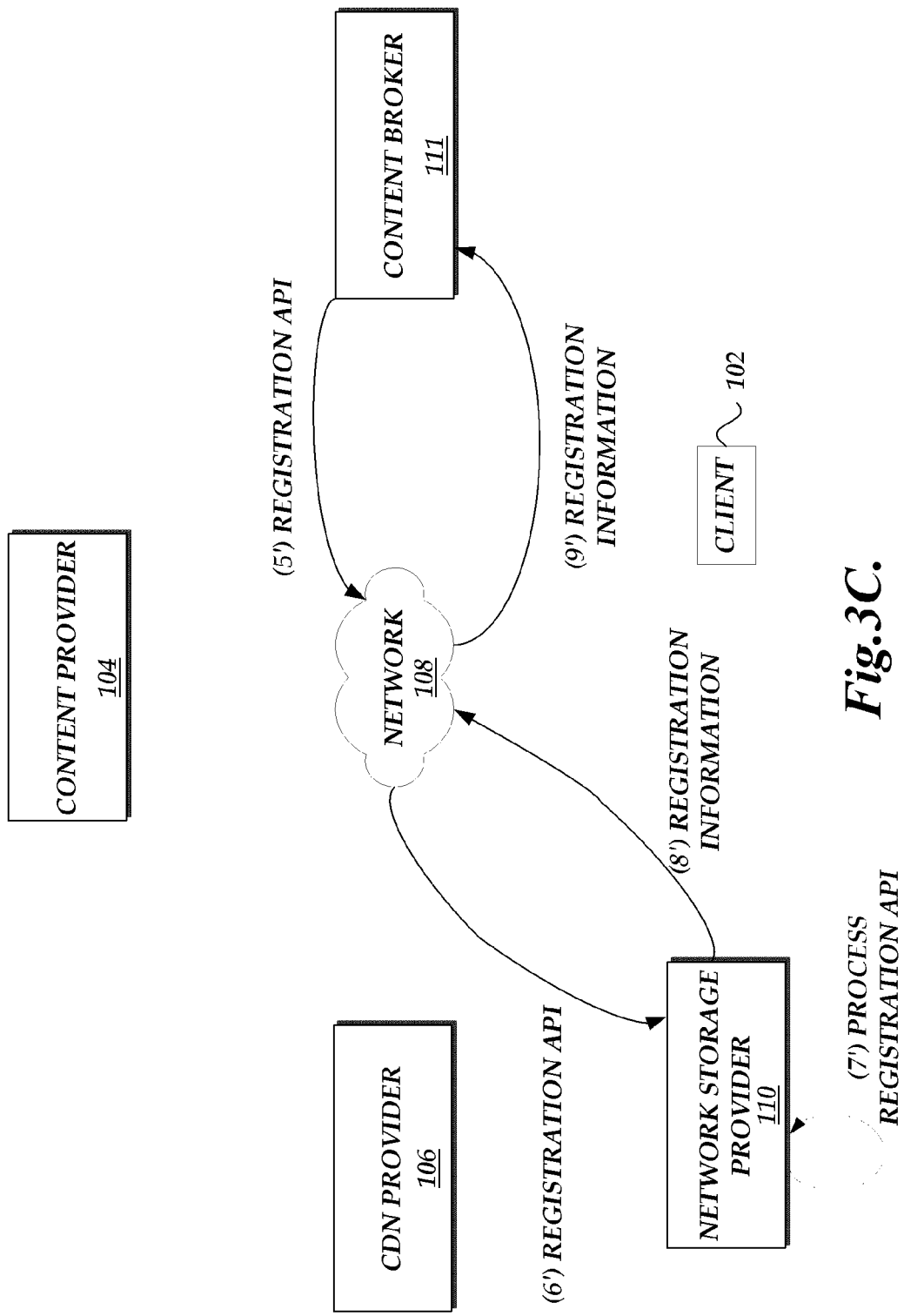
FIG. 3C is a block diagram of the content delivery environment of FIG. 1 illustrating the registration, by a content broker, of one or more resources with a network storage provider.

With reference now to FIG. 3C, an illustrative interaction for registration, by the content broker 111, of the one or more resources associated with a content provider 104 with the network storage provider 110 will be described. As illustrated in FIG. 3C, the network storage provider content registration process begins with registration by the content broker 111 of the one or more resources associated with the content provider 104 with the network storage provider 110. In an illustrative embodiment, the content broker 111 utilizes a registration application program interface ("API") to register with the network storage provider 110 such that the network storage provider 110 can provide the one or more resources on behalf of the content provider 104. The registration API includes the identification of the current storage location, such as the content provider origin server 114 or the SM component of content broker 111, which will provide requested resources to the network storage provider 110.

One skilled in the relevant art will appreciate that upon identification of appropriate storage location of the one or more resources, the content provider 104 or the content broker 111 can, as will be further described below in reference to FIGS. 4 and 5, begin to direct requests for content from client computing devices 102 to the network storage provider 110. Specifically, in accordance with DNS routing principles, a client computing device request corresponding to a resource identifier could eventually be directed to the IP address of a particular resource cache component 140, 144, 148 of the network storage provider 110. In another embodiment, a client computing device request corresponding to a resource identifier could eventually be directed to a DNS resolver of the network storage provider 110 so that the network storage provider 110 manages further routing of the request.

With continued reference to FIG. 3C, upon receiving the registration API, the network storage provider 110 obtains and processes the registration information. In an illustrative embodiment, the network storage provider 110 can then generate additional information that will be used by the client computing devices 102 as part of the content requests. The additional information can include, without limitation, content provider identifiers, such as content provider identification codes, network storage provider identifiers, such as network storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats. The network storage provider 110 then returns an identification of applicable domains for the network storage provider (unless it has been previously provided) and any additional information to the content broker 111. In another embodiment, the network storage provider 110 can return an identification of one or more IP addresses corresponding to the location of the content stored on behalf of the content provider 104. Even further, the network storage provider 110 could alternatively return an identification of available resource cache components 140, 144, 148 for selection by the content broker 111 for use in subsequently storing content on behalf of the content provider 104.

Figure 4A:
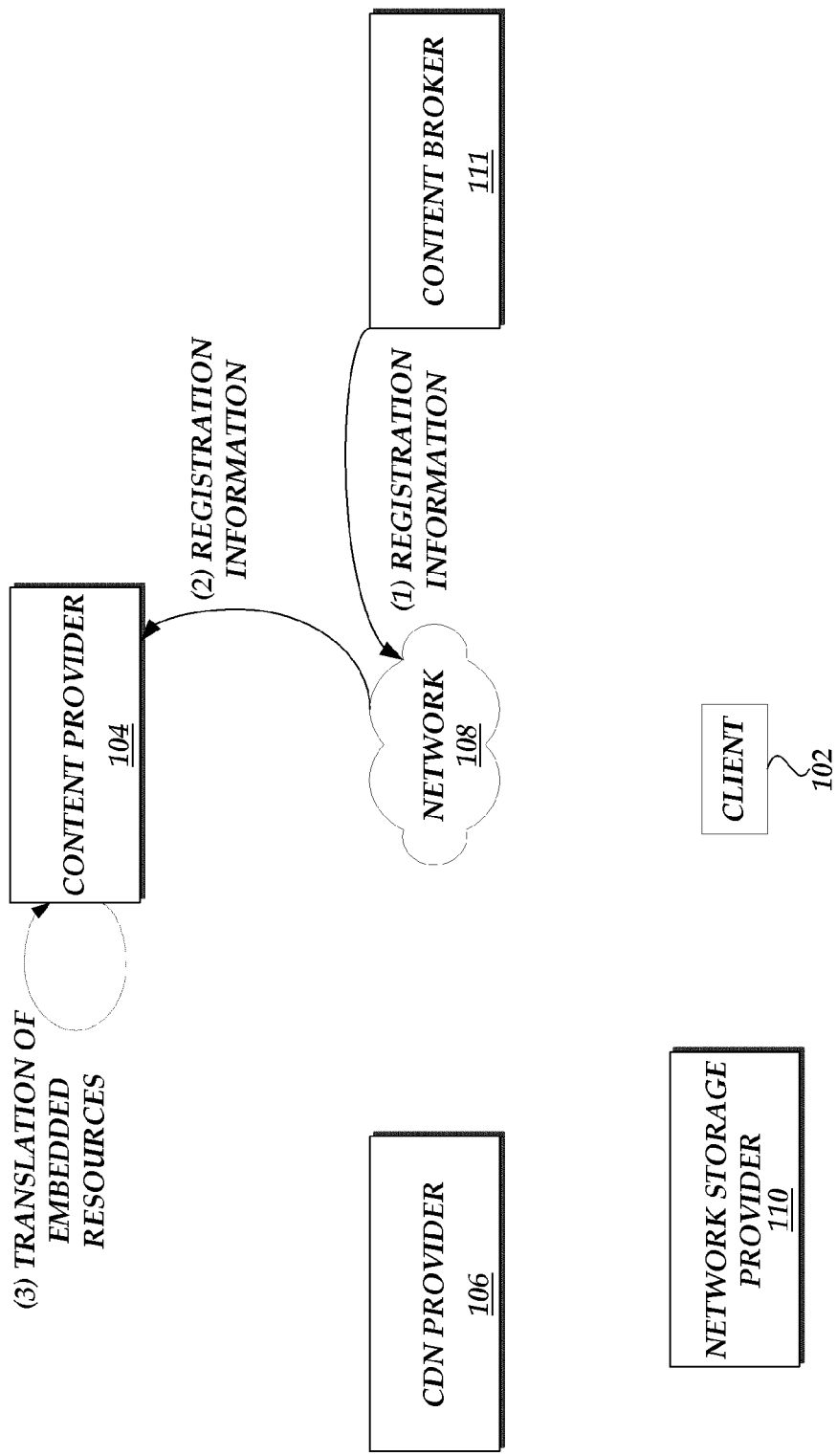
FIG. 4A is a block diagram of the content delivery environment of FIG. 1 illustrating one embodiment of the processing of resultant service provider registration information.

After registration with a service provider, and with reference now to FIG. 4A, the content broker 111 can then, in one embodiment, send a request to the content provider 104 to process the stored content with content broker and/or service provider specific information. In one example, instead of performing translation of URLs after initial registration with the content broker 111, the content provider 104 translates resource identifiers currently directed toward either the origin server 114 of the content provider 104 or a domain of another network storage provider 110 to a domain corresponding to content broker 111 upon receiving service provider registration information from the content broker 111 as illustrated in FIG. 4A. In other embodiments, the content provider 104 can alternatively translate the resource identifiers which are directed toward the origin server 114 of the content provider (e.g., if no prior translation has occurred) or which are directed to the content broker 111 (e.g., if a prior translation has occurred as described above) to a domain corresponding to the particular service provider selected by the content broker 111 on behalf of the content provider 104. As similarly described above, the translated URLs are embedded into requested content in a manner such that DNS queries for the translated URLs will resolve to a DNS server corresponding to the content broker 111 or the selected service provider and not a DNS server corresponding to content provider 104 or some other service provider which originally stored the content on behalf of the content provider 104.

With reference now to FIG. 4B, after completion of the registration and translation processes illustrated in FIG. 4A, a first client computing device 102A subsequently generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies and transmits the appropriate responsive content to the client computing device 102A. In an illustrative embodiment, the requested content can correspond to a Web page that is displayed on the client computing device 102A via the processing of information, such as HTML, XML, and the like. The requested content can also include a number of embedded resource identifiers, described above, that corresponds to resource objects that should be obtained by the client computing device 102A as part of the processing of the requested content. The embedded resource identifiers can be generally referred to as original resource identifiers or original URLs.

Figure 4C:
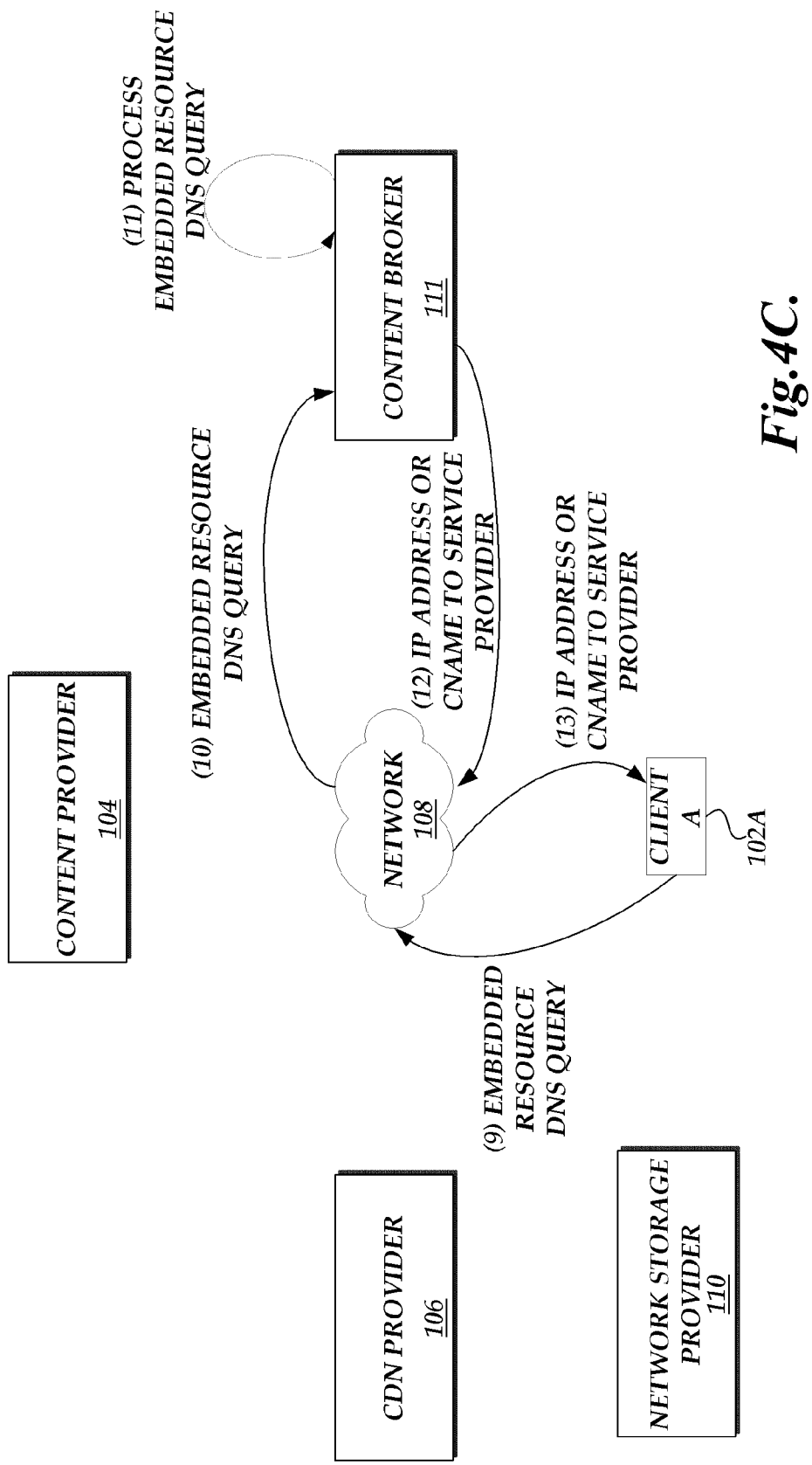
FIG. 4C is a block diagram of the content delivery environment of FIG. 1 illustrating the processing of a resource request by a content broker.

With reference now to FIG. 4C, upon receipt of the requested content, the client computing device 102A, such as through a browser software application, begins processing any of the markup code included in the content and attempts to acquire the resources identified by the embedded resource identifiers. Accordingly, the first step in acquiring the content corresponds to the issuance, by the client computing device 102A (through its local DNS resolver), of a DNS query for the original URL resource identifier that results in the identification of a DNS server authoritative to the "." and the "com" portions of the translated URL. Pursuant to the embodiment in which the translated URLs are directed to the content broker 111, after processing the "." and "com" portions of the embedded URL, the client computing device 102A then issues a DNS query for the resource URL that results in ".contentbroker" portion of the embedded URL. The issuance of DNS queries corresponding to the "." and the "com" portions of a URL are well known and have not been illustrated.

In an illustrative embodiment, the identification of a DNS server authoritative to the "contentbroker" corresponds to an IP address of a DNS server associated with the content broker 111. In one embodiment, the IP address is a specific network address unique to a DNS server component of the content broker 111. In another embodiment, the IP address can be shared by one or more components of the content broker 111. In this embodiment, a further DNS query to the shared IP address utilizes a one-to-many network routing schema, such as anycast, such that a specific component of the content broker 111 will receive the request as a function of network topology. For example, in an anycast implementation, a DNS query issued by a client computing device 102A to a shared IP address will arrive at a DNS server component of the content broker 111 logically having the shortest network topology distance, often referred to as network hops, from the client computing device. The network topology distance does not necessarily correspond to geographic distance. However, in some embodiments, the network topology distance can be inferred to be the shortest network distance between a client computing device 102A and a content broker component.

With continued reference to FIG. 4C, once one of the DNS servers in the content broker 111 receives the request, the specific DNS server attempts to resolve the request. The one or more DNS name servers of the content broker 111 can be authoritative to resolve client computing device DNS queries corresponding to the registered domain names of the content broker 111. As similarly set forth above, a DNS name server is considered to be authoritative to a DNS query if the DNS name server can resolve the query by providing a responsive IP address. As will be explained in detail below, to resolve the DNS query, the content broker 111 can maintain service provider selection criteria regarding the processing of requests for each resource, or a subset of resources. The service provider selection criteria can be provided by the content provider 104 and/or established by the content broker 111. In an illustrative embodiment, the content broker 111 can utilize the service provider selection criteria to determine whether a subsequent request for the resource should be processed by a network storage provider 110 or whether the subsequent request for the resource should be processed by a CDN service provider 106. In another embodiment, the content broker 111 can utilize the service provider selection criteria to identify a specific storage component or POP of a service provider for further processing the resource request. The service provider selection information can include the total number of requests obtained by the content broker 111 (measured directly or indirectly) for a resource over a defined period of time, trends regarding an increase/decrease in requests for the resource, a current financial cost associated with the delivery of the resource by the network storage provider, quality of service metrics measured by the network storage provider 110 or CDN service provider 106, additional criteria provided by the content provider 104, and various combinations or alternatives thereof.

In one illustrative embodiment, a specific DNS server of the content broker 111 can resolve the DNS query by identifying an IP address of a service provider storage component, such as CDN resource cache components 124, 130, 136 or network storage provider storage component 140, 144, 148 (FIG. 1), that will further process the request for the requested resource.

As an alternative to selecting a service provider storage component to provide an embedded resource, the content broker 111 can maintain sets of various alternative resource identifiers based on service provider registration information received from the service providers, such as the CDN service provider 106 or the network storage provider 110. The alternative resource identifiers can be provided by the content broker 111 to the client computing device 102A such that a subsequent DNS query on the alternative resource identifier will be processed by a DNS server component within the service provider's network. In this embodiment, a DNS name server associated with the content broker 111 (directly or indirectly) is able to receive the DNS query (corresponding to the domain in the embedded resource). However, as discussed above, because the DNS name server does not provide a responsive IP address to the query, it is not considered authoritative to the DNS query. Instead, the content broker 111 selects (or otherwise obtains) an alternative resource identifier that is intended to resolve to an appropriate DNS server of a service provider (e.g., the CDN service provider 106 or the network storage provider 110) based on a variety of criteria. For example, the content broker 111 may select an alterative resource identifier associated with a service provider based on service provider selection criteria such as a regional service plan or service level information obtained from the content provider 104. As will be described further below, this additional information may also be used for further request routing.

In an illustrative embodiment, the alternative resource identifiers are in the form of one or more canonical name ("CNAME") records. In one embodiment, each CNAME record identifies a domain of the service provider (e.g., "serviceprovider.com" or "serviceprovider-1.com"). As will be explained in greater detail below, the domain in the CNAME does not need to be the same domain found in original URL. Additionally, each CNAME record includes additional information, such as request routing information, (e.g., "request routing information"). An illustrative CNAME record can have the form of:

request_routing_information.serviceprovider.com

In an illustrative embodiment, the CNAME records are generated and provided by the one or more DNS servers of the content broker 111 to direct a more appropriate DNS server of a service provider, such as a DNS server of the CDN service provider 106 or the network storage provider 110. As used in accordance with the present disclosure, appropriateness can be defined in any manner by the content broker 111 for a variety of purposes. In one example, the content broker 111 can attempt to direct a DNS query to a DNS server associated with a service provider according to geographic criteria. The geographic criteria can correspond to geographic-based regional service plans contracted between the content broker 111 and the content provider 104 in which various service provider POPs are grouped into geographic regions. In this example, the DNS server of the content broker 111 may also obtain geographic information from the client directly (such as information provided by the client computing device or ISP) or indirectly (such as inferred through a client computing device's IP address).

In another example, the content broker 111 can attempt to direct a DNS query to a DNS server associated with a service provider according to service level criteria. The service level criteria can correspond to service or performance metrics contracted between the content broker 111 and the content provider 104. Examples of performance metrics can include latencies of data transmission between a service provider's POPs and the client computing devices 102, total data provided on behalf of the content provider 104 by a service provider's POPs, error rates for data transmissions, and the like.

In still a further example, the content broker 111 can attempt to direct a DNS query to a DNS server associated with a service provider according to network performance criteria. The network performance criteria can correspond to measurements of network performance for transmitting data from a service provider's POPs to the client computing device 102. Examples of network performance metrics can include network data transfer latencies, network data error rates, and the like.

In yet another example, the content broker 111 can attempt to direct a DNS query to a DNS server associated with a service provider according to cost information, at least in part. The cost information can correspond to a financial cost attributable to the content provider 104 for the delivery of resources by the network storage provider 110 and/or the CDN service provider 106. The financial cost may be defined in a variety of ways and can be obtained by the SM component 152 of the content broker 111 in a variety of ways.

In one example, the cost information may designate that the content provider 104 has requested that the SM component 152 of the content broker 111 select the service provider (generally referred to as either the network storage provider 110 or a CDN service provider 106) associated with the lowest current financial cost to provide the requested resource. Accordingly, the SM component 152 of the content broker 111 could obtain cost information for at least a portion of the POPs and select the POP of the server provider (e.g., the network storage provider 110 or the CDN service provider 106) associated with the lowest financial cost. The financial cost information utilized to select the lowest financial costs may be based on a current financial costs or projected financial costs. The projected financial costs can be based on criteria, such as time of day, characteristics of the resource (e.g., size of the data, type of data, etc.), anticipated data throughput volumes, current loads experienced by each service provider, and the like. For example, if a service provider's POP resources are at an optimal capacity, the service provider may project financial cost at a premium cost level (e.g., a highest cost level) because any additional data traffic would cause the resources to operate above optimal rates. Conversely, the service provider may project lower financial costs for specific POPs according to historically known low volume times (e.g., time of day, days of the month, time of the year, special days/holidays, etc.). The financial cost information may be a single cost projected for each identifiable service provider. Alternatively, the financial cost information may be a set of costs associated with one or more identifiable components of each service provider (e.g., financial information for one or more POPs associated with a service provider).

In another example, the cost information may designate that the content provider 104 has requested that the cost associated with providing the requested resource be maintained below one or more cost thresholds or cost tiers. Accordingly, the SM component 152 of the content broker 111 could obtain financial cost information for the available service providers and select only those service providers with a financial cost at or below the cost thresholds. The SM component 152 of the content broker 111 could then utilize other request routing criteria to select from the selected DNS servers (if more than one DNS server is identified) or selected in accordance with other selections methodologies (e.g., random, round robin, etc.).

In another embodiment, the SM component 152 of the content broker 111 can utilize a determined/projected volume of request information for selecting a service provider and/or a specific DNS server of the service provider. The determined/projected volume of request information can include the total number of requests obtained by the content broker 111 for a resource over a defined period of time, trends regarding an increase/decrease in requests for the resource, and various combinations or alternatives thereof. Alternatively, as will be described below, the SM component 152 of the content broker 111 can obtain information associated with received resource requests from corresponding network storage components 110 or CDN service providers 106 to obtain the determined/projected volume of request information. For example, the various network storage providers 110 and CDN service providers 106 can provide the content broker 111 with log files of received resource requests.

In yet another embodiment, the SM component 152 of the content broker 111 can utilize other content provider specified criteria for selecting a service provider. The content provider specified criteria can correspond to a variety of measurements or metrics specified by the content provider 104 and related to the delivery of resources on behalf of the content provider. The measurements or metrics can include content provider specified quality metrics (e.g., error rates), user complaints or error reports, and the like.

In accordance with an illustrative embodiment, the content broker 111 maintains a data store that defines CNAME records for various URLs corresponding to embedded resources. If a DNS query corresponding to a particular URL matches an entry in the data store, the content broker 111 returns a CNAME record to the client computing device 102A as defined in the data store and as illustrated in FIG. 4C. In an illustrative embodiment, the data store can include multiple CNAME records corresponding to a particular original URL. The multiple CNAME records would define a set of potential candidates that can be returned to the client computing device. In such an embodiment, the DNS server of the content broker 111, either directly or via a network-based service, can implement additional logic in selecting an appropriate CNAME from a set of possible of CNAMEs.

The returned CNAME can also include request routing information that is different from or in addition to the information provided in the URL of the current DNS query. For example, if the CNAME selection is based on a regional service plan or a service level plan selected by the content provider 104, a specific identifier can be included in the "request_routing_information" portion of the specific CNAME record. In another embodiment, request routing information can be found in the identification of a service provider domain different from the domain found in the original URL. For example, if the CNAME is based on a regional plan, a specific regional plan domain (e.g., "serviceprovider-region1.com") could be used in the domain name portion of the specific CNAME record. Any additional request routing information can be prepended to the existing request routing information in the original URL such that the previous request routing information would not be lost (e.g., http://serviceplan.regionalplan.serviceprovider.com). One skilled in the relevant art will appreciate that additional or alternative techniques and/or combination of techniques may be used to include the additional request routing information in the CNAME record that is identified by the network storage provider 110.

Figure 5A:
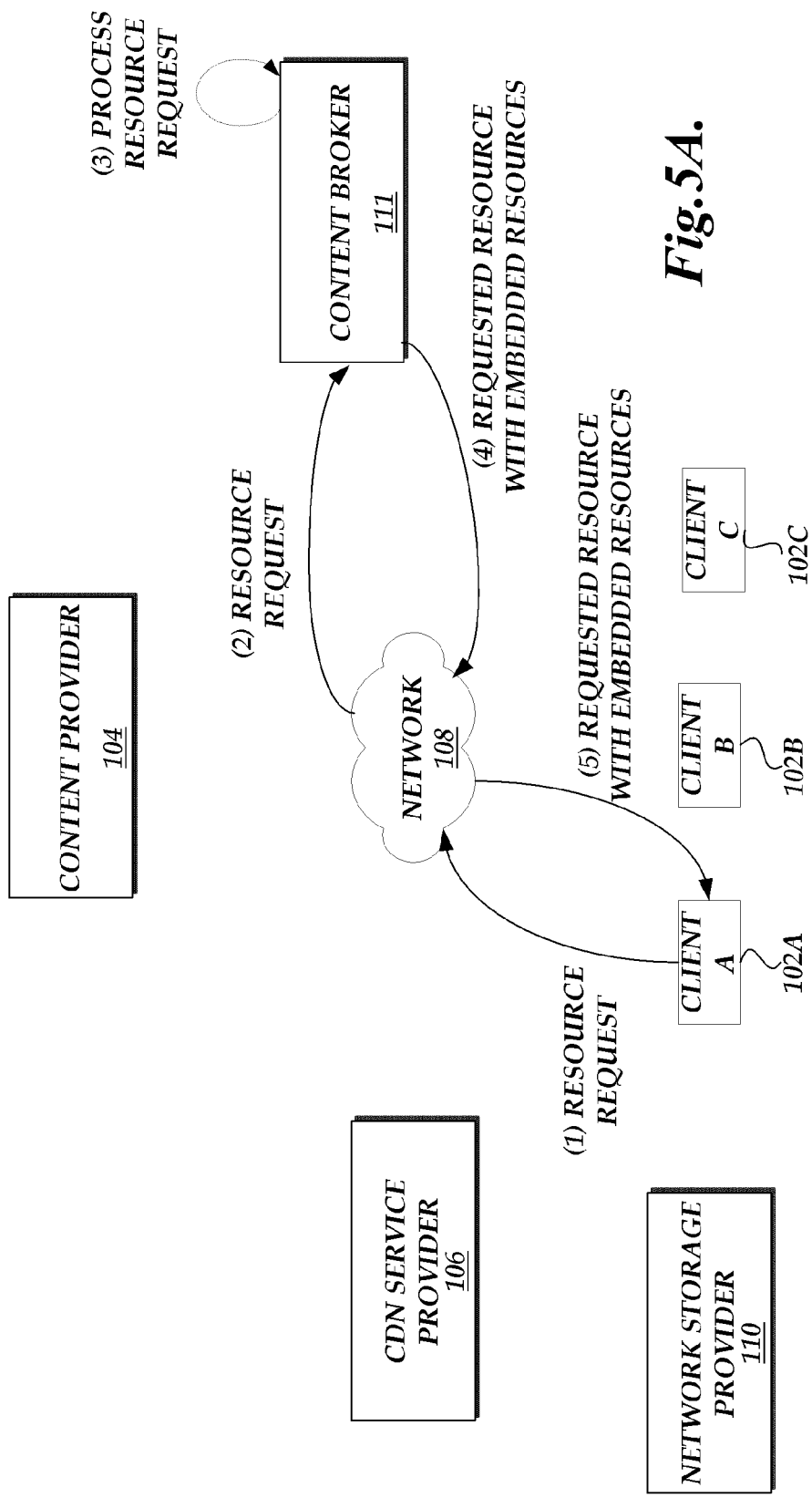
FIG. 5A is a block diagram of the content delivery environment of FIG. 1 illustrating another embodiment of the processing of resultant service provider registration information via the generation and processing of a resource request by a client computing device to a content broker.

With reference now to FIG. 5A, in another embodiment, the content broker 111 processes client DNS queries for the original content (e.g., Web page) instead of the content provider 104 as shown in FIG. 4B. In this embodiment, during registration with the content broker 111, the content provider 104 requests the content broker to host the original content or to process requests for the original content on its behalf in addition to facilitate the provision of embedded resources by a service provider. Once the content broker 111 manages the original content on behalf of the content provider 104, the content broker 111 can, in one embodiment, translate resource identifiers corresponding to one or more embedded resources so that client DNS queries for the embedded resources are also directed to the content broker 111. In an alternative embodiment, upon registering one or more embedded resources with a service provider, the content broker 111 may instead translate the embedded resource identifiers in the original content based on service provider registration information so that subsequent DNS queries for the embedded resources are processed by one or more service providers.

With continued reference to FIG. 5A, after completion of the registration and translation processes in accordance with this embodiment, a first client computing device 102A generates a content request that is received and processed by the content broker 111 on behalf of the content provider 104. In accordance with an illustrative embodiment, the request for the content can be in accordance with common network protocols, such as HTTP. Upon receipt of the content request, the content broker 111 identifies and transmits the appropriate responsive content to the client computing device 102A. In an illustrative embodiment, the requested content can correspond to a Web page that is displayed on the client computing device 102A via the processing of information, such as HTML, XML, and the like. The requested content can also include a number of embedded resource identifiers, described above, that corresponds to resource objects that should be obtained by the client computing device 102A as part of the processing of the requested content. The embedded resource identifiers can be generally referred to as original resource identifiers or original URLs.

Figure 5B:
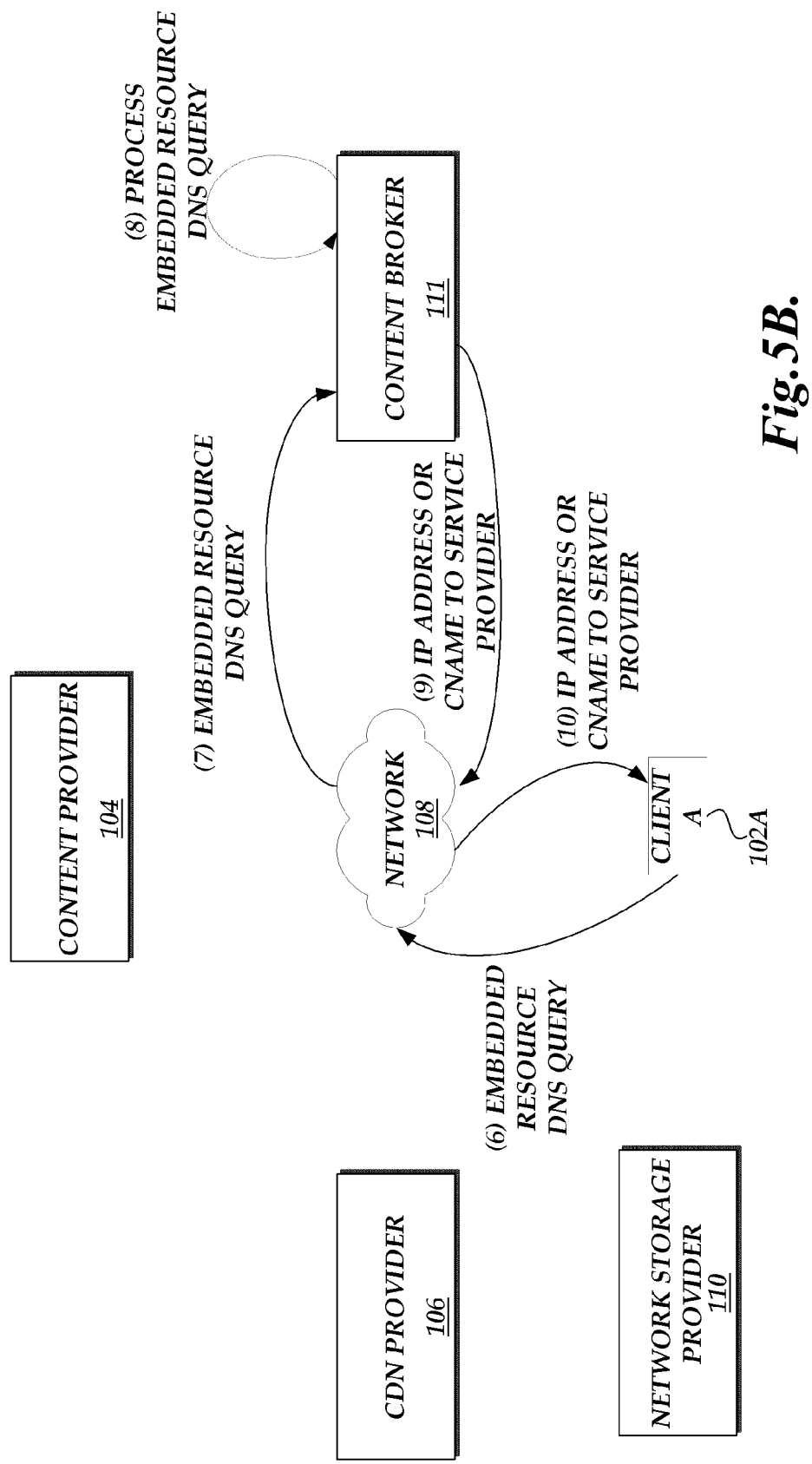
FIG. 5B is a block diagram of the content delivery environment of FIG. 1 illustrating the processing of a resource request by a content broker upon receiving the resource request from a client computing device.

With reference now to FIG. 5B, in accordance with the embodiment in which the embedded resource identifiers are associated with the content broker 111, the client computing device 102A then begins processing any of the markup code included in the content and attempts to acquire the resources identified by the embedded resource identifiers from the content broker 111. Further processing in this embodiment is identical to that described above in reference to FIG. 4C and accordingly will not be further described in reference to FIG. 5B.

With reference now to FIG. 6, one embodiment of a routine 600 implemented by the content broker 111 for managing registration of one or more resources stored on behalf of a content provider 104 with a service provider will be described. One skilled in the relevant art will appreciate that actions/steps outlined for routine 600 may be implemented by one or many computing devices/components that are associated with the content broker 111. Accordingly, routine 600 has been logically associated as being generally performed by the content broker 111, and thus the following illustrative embodiments should not be construed as limiting.

At block 602, the content broker 111 obtains a service provider inquiry from a content provider 104. The service provider inquiry requests initial information regarding the potential use of a service provider, such as a CDN service provider 106 or network storage provider 1110, to provide one or more resources on behalf of the content provider 104. In one embodiment, the content provider 104 may desire to register one or more individual object files, such as those corresponding to embedded resources. In addition or alternatively, the content provider 104 may desire to register all objects associated with a resource, such as a particular domain.

In response to the service provider inquiry, the content broker 111 causes a user interface for registering one or more resources with a service provider to be generated at block 604. The content broker 111 accordingly obtains information to be provided as a part of the service provider registration user interface. For example, in one portion of the user interface, the content broker 111 may provide an identification of one or more resources. For a particular embedded resource, such identification information can, for example, include the embedded resource name, the embedded resource type, a current domain associated with the embedded resource, a size of the embedded resource, and the like. The content broker 111 may also obtain and provide additional information in the user interface, such as a number of times each of the one or more resources has been requested by a client computing device 102, one or more recommended service providers, an option to select one or more available service providers from a list, one or more options corresponding to service provider selection criteria such as a regional service plan or a service level plan, and the like. Even further, the service provider registration user interface includes one or more service provider selection components that provide a content provider an option to automatically initiate publication of the one or more resources to one or more service providers.

In one illustrative embodiment, the content broker 111 may determine that a recommendation to use a particular service provider to provide a particular resource should be provided. Based on this determination, the content broker 111 would cause a recommendation to be included in the service provider registration user interface, or alternatively for an updated service provider registration user interface to be generated and provided to the content provider 104. For example, the content broker 111 may determine the volume of requests for each resource. If an embedded resource, such as one with a relatively large file size, has been requested a high number of times, the content broker 111 may determine that this embedded resource is a candidate for being provided by a CDN service provider 106 and accordingly generate a corresponding recommendation.

In another illustrative embodiment, the content broker 111 can determine whether to make a service provider recommendation based on a variety of criteria, such as cost to the content provider, quality of service, throughput, content provider contractual obligations, latency, internet weather, and the like. In some embodiments, the content broker 111 can collect information regarding such criteria from the content provider 104, either as a part of the initial service provider inquiry from the content provider 104 or subsequent thereto. Even further, the content broker 111 can utilize a web service to determine whether to make a particular service provider recommendation. For example, the content broker 111 can utilize the testing system disclosed in U.S. patent application Ser. No. 12/240,740, titled "Service Provider Optimization of Content Management" and hereby incorporated by reference, to make service provider recommendations. Yet further, in other embodiments, the content broker 111 can recommend registration with one or more service providers. Such recommendations can occur at the time of initial registration or as updated recommendations any time thereafter. Even further, rather than providing a recommendation to the content provider 104, the content broker 111 can make the selection of a service provider on behalf of the content provider based on any of the service provider selection criteria described above.

Continuing with FIG. 6, at block 606, the content broker 111 obtains service provider registration information from the content provider 104. The service provider registration information includes a request from the content provider 104 to publish one or more resources to a service provider so that the service provider provides the one or more resources on behalf of the content provider 104. The service provider registration information can also include other information obtained from the content provider 104 such as an identification of a particular service provider, a select regional plan, a select service level plan, and the like. The content broker 111 also obtains any additional service provider registration information, whether from the content provider 104 or otherwise, which may be needed to register the one or more resources with one or more service providers. The additional service provider registration information may include an identification of the one or more resources requested to be published to a service provider, content provider billing information, content broker billing information, and the like. As similarly set forth above, the identification information associated with the one or more resources may include any one or more of the embedded resource name, the embedded resource type, the current domain, the size of the embedded resource, and the like. In one illustrative embodiment, the content broker 111 obtains all service provider registration information necessary to register the one or more resources with the service provider on behalf of the content provider 104 in a single request.

Next, at block 608, the content broker 111 transmits a service provider generation request associated with the obtained service provider registration information to the service provider. At block 610, the content broker 111 then processes data corresponding to the resultant registration of the one or more resources with the service provider. In one illustrative embodiment, the content broker 111 requests or otherwise causes the content provider 104 to modify one or more resource identifiers corresponding to the one or more resources so that subsequent requests for the one or more resources are directed to the service provider. In an alternative embodiment, the content broker 111 requests or otherwise causes the content provider 104 to modify one or more resource identifiers corresponding to the one or more resources so that subsequent requests for the one or more resources are directed to the content broker 111. In this alternative embodiment, the content broker 111 also obtains an alternative resource identifier or an IP address of a storage component of the service provider corresponding to each of the one or more resources so that the content broker 111 can redirect client requests for the one or more resources to the service provider for further processing or to the specific storage component of the service provider for resolution. In yet another embodiment, when the content broker 111 hosts or processes original content on behalf of the content provider 104, the content broker 111 (rather than the content provider 104) translates the identifiers corresponding to the embedded resources in the foregoing embodiments. In any of the foregoing embodiments, the content broker 111 may also notify the content provider 104 that the one or more resources have been registered with a particular service provider. The routine 600 ends at block 612.

Although many of the above described embodiments disclose use a user interface and receive input responsive to human interaction, the content provider 104 and the content broker 111 may interact via a series of API calls. In such embodiments, the content provider 104 or the content broker 111 may programmatically process the APIs, e.g., in accordance with defined business rules or other logic such that additional human interaction is not necessary. Accordingly, the present application should not be limited to use of a user interface. For example, rather than generating a user interface at block 504, the content broker 111 may generate one or more API calls to the content provider 104 similarly requesting information to determine a service provider that should be used to host content on behalf of the content provider 104. Likewise, the content provider 104 can automatically process the one or more APIs and return information to the content broker 111.

Additionally, as similarly mentioned above, while the above-described user interface or corresponding API calls can be generated relative to initial registration of the content provider 104 with the content broker 111, similar user interfaces or API calls can be subsequently generated. For example, the content provider 104 may request an updated service provider recommendation from the content broker based on the same or further updated service provider criteria. As another example, the content provider 104 may provide updated service provider criteria and simply request the content broker 111 to publish the one or more previously registered resources to a new service provider, if necessary, based on the updated service provider criteria. Even further, the content broker 111 may automatically determine and implement new service providers at any time on behalf of the content provider 104 based on the original service provider criteria.

Figure 7:
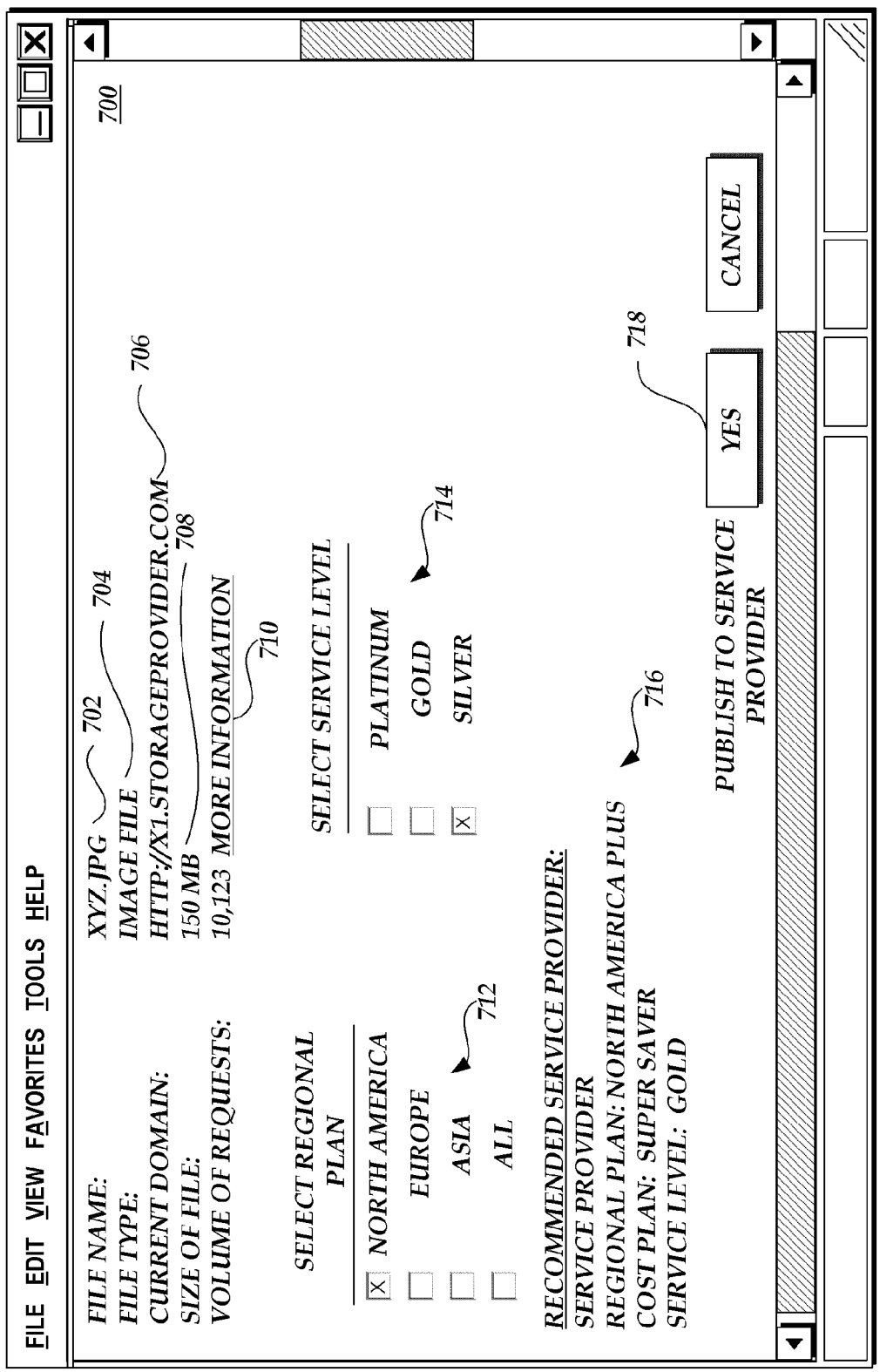
FIG. 7 is an illustrative user interface displaying information for use in registering with a content delivery network service provider.

With reference now to FIG. 7, one illustrative embodiment of a user interface or screen display 700 in which information for registering one or more resources with a service provider will now be described. In this illustrative embodiment, the screen display 700 is a Web page illustrating a presentation of content regarding the potential registration of a particular resource with one or more service providers. The screen display 700 includes a service provider selection component 718 which when selected causes a request to register the identified resource with a service provider to be sent to the content broker 111. In one embodiment, with respect to a particular embedded resource, the screen display 700 also includes information identifying the embedded resource, such as an embedded resource name 702, an embedded resource type 704, a current domain associated with the embedded resource 706, and a size of the embedded resource 708. The screen display 700 further includes information identifying a number of times the embedded resource has been requested, as well as a link 710 corresponding to an identifier that when selected provides more detailed information regarding client requests for the embedded resource. In another embodiment, where the resource corresponds to a domain of the content provider, the screen display 700 could also similarly include information associated with the domain, such as a domain identification, a number of requests associated with the domain, a number of embedded resources associated with the domain, and the like.

In another portion of the screen display 700, service provider selection criteria are provided. For example, a regional plan selection component 712 and a service level selection component 714 are provided to allow the content provider 104 to select desired parameters associated with a service provider. While not illustrated in FIG. 7, other service provider selection criteria may be presented on the screen display 700, such as an identification of whether the content provider 104 has a preference for a particular type of service provider, such as a CDN service provider 106 vs. a network storage provider 110, or a menu of available service providers for selection by the content provider 104. Finally, the display screen 700 includes a specific service provider recommendation 716 generated by the content broker 111. As similarly set forth above, the recommendation may identify one or more service providers for hosting content on behalf of the content provider 104.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached Figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   one or more computing devices configured to:
      determine that use of a service provider should be recommended by a content broker to a content provider based on an evaluation of past requests monitored by the content broker for one or more resources, wherein the one or more resources are one of hosted or processed by the content broker on behalf of the content provider;
      obtain registration information at the content broker for registering one or more resources associated with the content provider with a service provider; and
      transmit a service provider generation request from the content broker to the service provider, the service provider generation request corresponding to the registration information.

2. The system as recited in claim 1, wherein the one or more resources correspond to one or more embedded resources.

3. The system as recited in claim 1, wherein the service provider is a CDN service provider.

4. The system as recited in claim 1, wherein the service provider is a network storage provider.

5. The system as recited in claim 1, wherein the past requests monitored by the content broker include past requests made to the content broker for one or more resources.

6. The system as recited in claim 1, wherein the past requests monitored by the content broker for one or more resources correspond to one or more resources that are stored and provided by the content broker on behalf of the content provider.

7. The system as recited in claim 1, wherein the registration information includes an identification of a particular service provider by the content provider.

8. The system as recited in claim 1, wherein the one or more computing devices is further configured to select a service provider by the content broker on behalf of the content provider based on the registration information.

9. The system as recited in claim 1, wherein the registration information includes identification of the one or more resources to be provided by the service provider and service provider selection criteria provided by the content provider.

10. The system as recited in claim 1, wherein the one or more computing devices is further configured to:
    cause generation, by the content broker, of a user interface for registering the one or more resources with a service provider.

11. The system as recited in claim 10, wherein the user interface provides an option for a content provider to select to register with a service provider by selection of a single control.

12. The system as recited in claim 10, wherein the user interface provides identification of one or more recommended service providers.

13. The system as recited in claim 10, wherein the one or more computing devices is further configured to:
    obtain a service provider inquiry from a content provider at the content broker, wherein the service provider inquiry corresponds to an initial request to register one or more resources with a service provider.

14. The system as recited in claim 1, wherein the one or more computing devices is further configured to:
    cause generation, by the content broker, of an API call for registering the one or more resources with a service provider.

15. The system as recited in claim 1, wherein the one or more computing devices is further configured to:
    upon registration of the one or more resources with the service provider, notify the content provider of the registration of the one or more resources with the service provider.

16. The system as recited in claim 1, wherein the one or more computing devices is further configured to:
send a request from the content broker for the content provider to modify one or more resource identifiers corresponding to the one or more resources so that subsequent requests for the one or more resources are directed to the service provider.

17. The system as recited in claim 1, wherein the one or more computing devices is further configured to:
cause the content provider to modify one or more resource identifiers corresponding to the one or more resources so that subsequent requests for the one or more resources are directed to the content broker.

18. The system as recited in claim 17, wherein the one or more computing devices is further configured to:
obtain, at the content broker, an alternative resource identifier corresponding to each of the one or more resources, wherein the alternative resource identifier corresponds to an identification of the service provider for providing the associated resource.

19. The system as recited in claim 17, wherein the one or more computing devices is further configured to:
obtain, at the content broker, an IP address corresponding to a storage component of the service provider for each of the one or more resources.

20. A computer-implemented method comprising:
as implemented by one or more computing devices configured with a specific executable instructions,
determining that use of a service provider should be recommended by a content broker to a content provider based on an evaluation of past requests monitored by the content broker for one or more resources, wherein the one or more resources are one of hosted or processed by the content broker on behalf of the content provider;
obtaining registration information at the content broker for registering one or more resources associated with the content provider with a service provider; and
transmitting a service provider generation request from the content broker to the service provider, the service provider generation request corresponding to the registration information.

21. The computer-implemented method as recited in claim 20, wherein the past requests monitored by the content broker include past requests made to the content broker for one or more resources.

22. The computer-implemented method as recited in claim 20, wherein the past requests monitored by the content broker for one or more resources correspond to one or more resources that are stored and provided by the content broker on behalf of the content provider.

23. The computer-implemented method as recited in claim 20, wherein the registration information includes an identification of a particular service provider by the content provider.

24. The computer-implemented method as recited in claim 20 further comprising selecting a service provider by the content broker on behalf of the content provider based on the registration information.

25. The computer-implemented method as recited in claim 20 further comprising:
causing generation, by the content broker, of a user interface for registering the one or more resources with a service provider.

26. The computer-implemented method as recited in claim 25, wherein the user interface provides an option for a content provider to select to register with a service provider by selection of a single control.

27. The computer-implemented method as recited in claim 25, wherein the user interface provides identification of one or more recommended service providers.

28. The computer-implemented method as recited in claim 25 further comprising:
obtaining a service provider inquiry from a content provider at the content broker, wherein the service provider inquiry corresponds to an initial request to register one or more resources with a service provider.

29. The computer-implemented method as recited in claim 20 further comprising:
upon registration of the one or more resources with the service provider, notifying the content provider of the registration of the one or more resources with the service provider.

* * * * *